United States Patent [19]
Ikawa et al.

[11] Patent Number: 5,922,491
[45] Date of Patent: Jul. 13, 1999

[54] SECONDARY BATTERY

[75] Inventors: Kyoko Ikawa, Hitachi; Yasushi Muranaka, Hitachinaka; Tatsuo Horiba; Yosimi Komatu, both of Hitachi, all of Japan

[73] Assignees: Hitachi, Ltd.; Hitachi Chemical Co., Ltd., both of Tokyo, Japan

[21] Appl. No.: 08/656,963

[22] Filed: Jun. 6, 1996

Related U.S. Application Data

[30] Foreign Application Priority Data

Jun. 23, 1995 [JP] Japan .................................. 7-179630

[51] Int. Cl.⁶ ..................................................... H01M 4/38
[52] U.S. Cl. .................... 429/218; 429/231.1; 429/231.8
[58] Field of Search .............................................. 421/218

[56] References Cited

U.S. PATENT DOCUMENTS 5,028,500  7/1991  Fong et al. ............................... 429/194
5,366,831  11/1994  Watada et al. .

FOREIGN PATENT DOCUMENTS 0 353 837  2/1990  European Pat. Off. .
94 19939  9/1994  WIPO .

OTHER PUBLICATIONS

Patent Abstracts of Japan, vol. 018, No. 167 (E–1528), Mar. 22, 1994.

*Primary Examiner*—Stephen Kalafut
*Assistant Examiner*—Carol Chaney
*Attorney, Agent, or Firm*—Antonelli, Terry, Stout & Kraus, LLP

[57] ABSTRACT

A secondary battery having a large capacity, and a preferable characteristics in both rapid charging and rapid discharging comprises a positive electrode a negative electrode, and an electrolyte which separates said electrodes, in which any one of the positive electrode or negative electrode contains particles composed of a material contributing to a charge-discharge reaction, and the particles comprise at least two phases and fine pores which are formed by dissolving at least one of the phases.

15 Claims, 8 Drawing Sheets

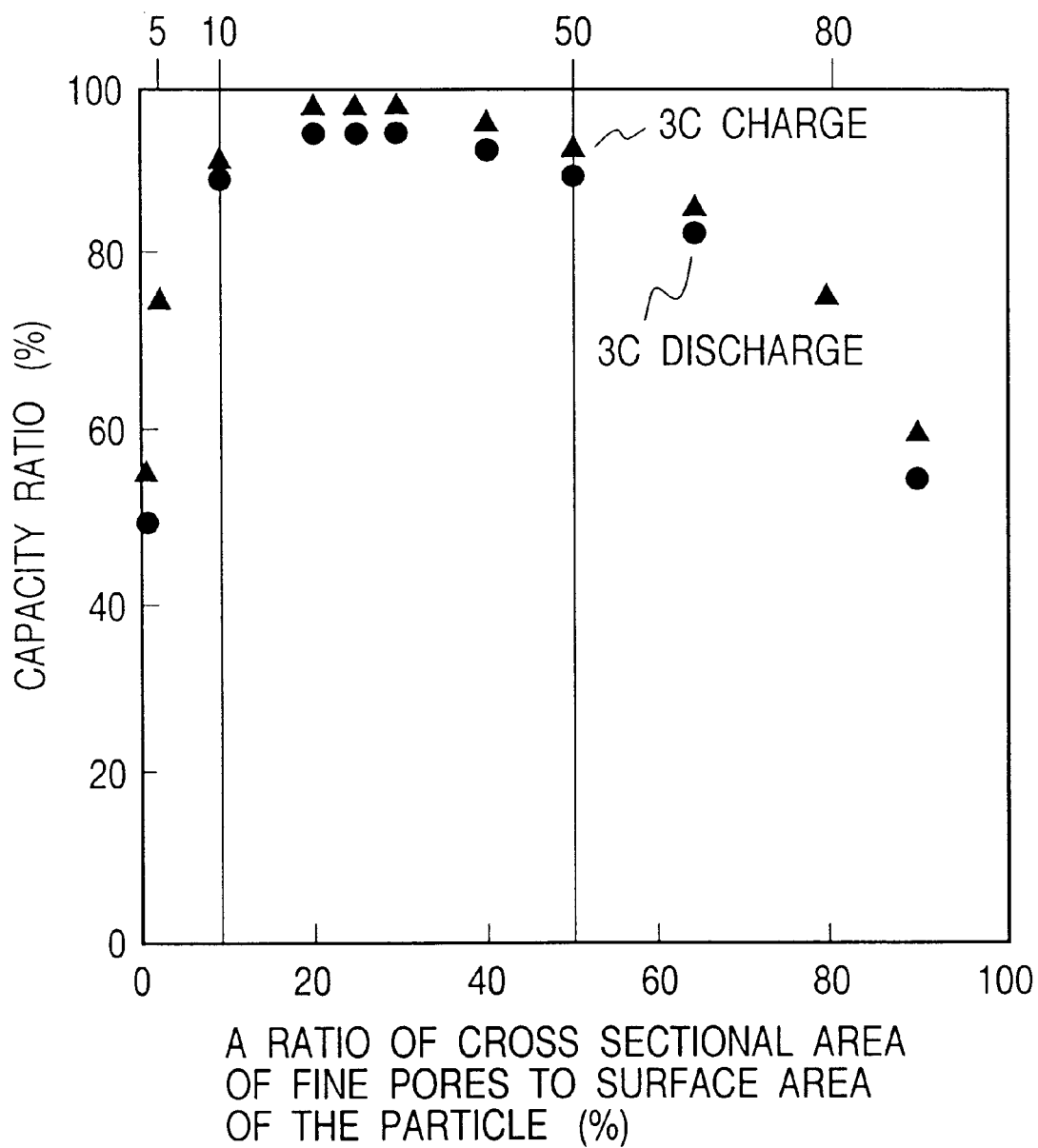

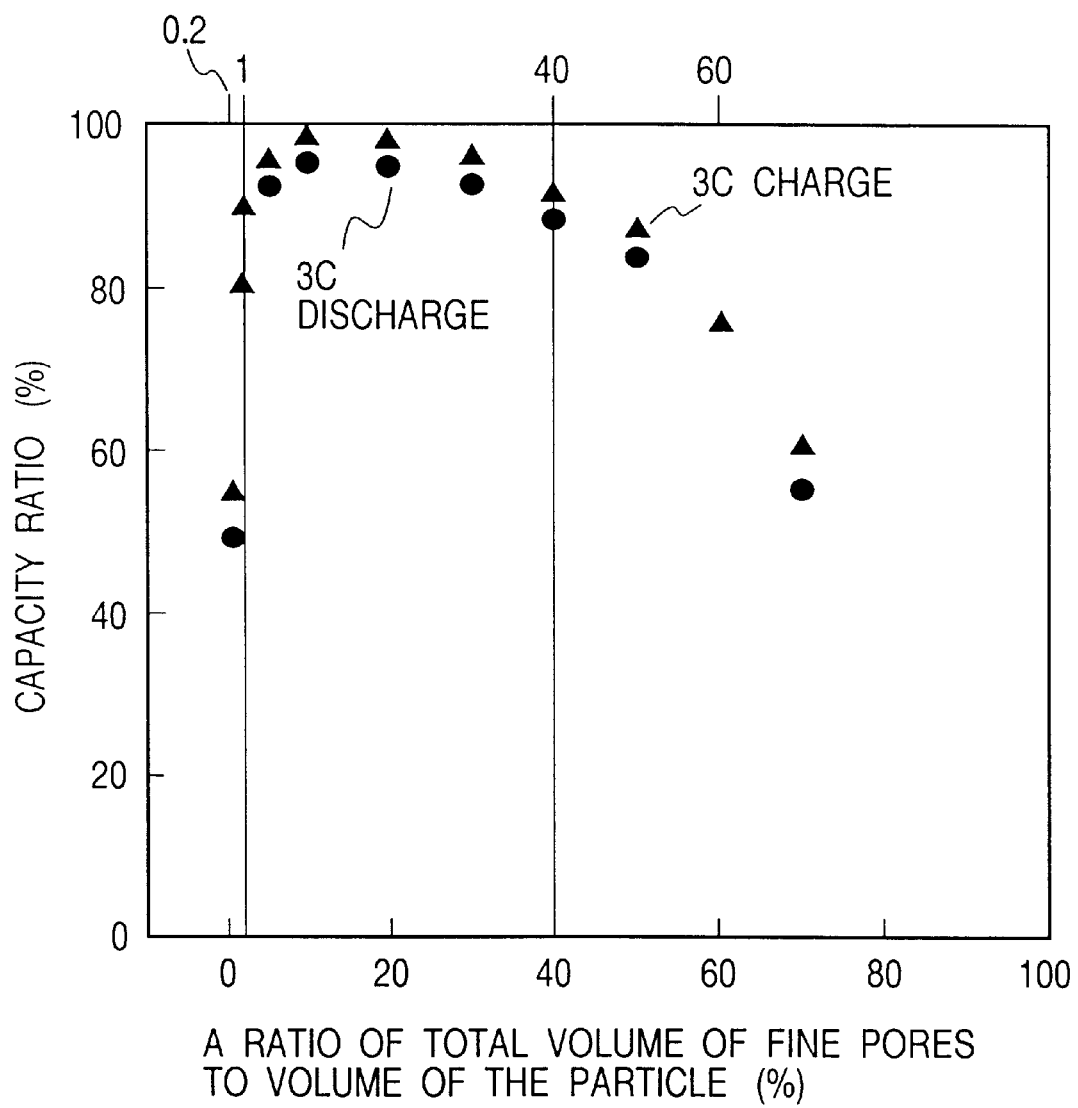

SECONDARY BATTERY

BACKGROUND OF THE INVENTION

The present invention relates to secondary batteries and, in particular, to second batteries having a large capacity and improved characteristics for rapid charging and rapid discharging.

In accordance with current widespread use of various small sized cordless apparatus, the demand for batteries as a power source is rapidly increasing. Particularly, from the point of view of convenience in use, a demand for batteries having a large capacity, which make it possible to use an apparatus for a long operating time with one charge of the batteries, has increased.

The demand for increased capacity in batteries used by consumers has been strong, and accordingly, development in technology for increasing the capacity of batteries has been continued for a long time. As for current batteries of this type, there are a nickel-metal hydride battery and a lithium secondary battery. A negative electrode composed of a hydrogen storage alloy as a main component is used in the nickel-metal hydride battery. The nickel-metal hydride battery has approximately the same characteristics in battery voltage, discharge behavior, and other factors, as a nickel-cadmium battery, providing interchangeability with the nickel-cadmium battery, and is noted as a battery which can be expected to increase the battery capacity by 50–100%. Further, the lithium secondary battery is a battery with a large capacity similar to the nickel-metal hydride battery and is popular because of its high battery voltage and light weight. Accordingly, the nickel-metal hydride battery and the lithium secondary battery are expected to be used in most types of the cordless apparatus in the near future. Furthermore, in consideration of future depletion of oil reserves, environmental problems such as destruction of the ozone layer by carbon dioxide, and a flattening of the power demand, use of the above described batteries will become important as large scale power sources for electric cars and dispersed type power applications storage.

In view of the convenience of use of the battery, an improvement in the rapid charging characteristics of the battery, which indicates the extent to which the battery can be charged in a short time, has been the subject of increased demand. On the other hand, in consideration of an apparatus which requires a large discharge current, such as an electric car, a rapid discharge characteristic is also important. If the above described characteristics are insufficient for a desired application, usage of the battery for that purpose is restricted extremely. A lead battery and nickel-cadmium battery have sufficient characteristics with certain limits both in their rapid charging behavior and their rapid discharging behavior, but the nickel-metal hydride battery and the lithium secondary battery actually do not have sufficient characteristics with respect to rapid charging or rapid discharging behavior.

Hitherto, various methods to improve the nickel-metal hydride battery as to its rapid charge-discharge characteristics have been disclosed. For instance, there has been proposed use of an electrode made of a hydrogen storage alloy composed of ultrafine particles having an average particle size equal to or less than 5 microns (JP-A-60-119079 (1985)), use of a sheet-shaped electrode made of a hydrogen storage alloy containing a binder provided with pores at least 30 microns in diameter (JP-A-61-153947 (1986)), and use of an electrode made of hydrogen storage alloy particles (mother particles), the surface of which is coated with particles of a metal, a nickel base alloy, or stainless steel having an average diameter of $\frac{1}{10} \sim \frac{1}{200}$ (JP-A-64-6366 (1989)). Regarding a lithium battery, a method for improving the rapid charge-discharge characteristics by coating the surface of a current collector has been disclosed (JP-A-5-159781 (1993)).

Generally speaking, an electrode is made of a porous plate which is prepared by pulverizing a material effective for a battery reaction to fine powder, and subsequently, forming the fine powder into a sheet by adding an adhesive thereby, or by binding the particles the fine powder by sintering. Accordingly, decreasing average diameter of the particles produces a more effective as porous material layer for battery reaction to the extent of the decrease in diameter of the particles, and also produces an increase in the field area of the reaction. However, practically, the finer the pulverized material relating to the battery reaction is, the more will be the powder fall out from the electrode. Therefore, there are problems with such measures, such as lowering of the capacity of the battery and the forming a coating film composed of impurities at the surface of the material relating to the battery reaction in the pulverizing process, with the result that the coating film causes a resistance against the battery reaction which makes the rapid charge-discharge characteristics worse.

Forming pores at the surface of the material relating to the battery reaction is effective in increasing the field area for the battery reaction, but the forming of pores at surface of the adhesive or a boundary of the particles is futile. Providing the electrode with a plurality of pores will cause the electrode to have a decreased packing density of the material relating to the battery reaction, and practically, the capacity of the battery will be decreased. In accordance with a method wherein conductive particles are arranged around a particle of the material relating to the battery reaction, various shapes of the conductive particles such as a fiber or film, can be used. And, various kind of the conductive particles, such as carbon, a metal, and a reaction catalyst, can be used so long as it may does not affect the conductivity. However, the addition of such a material which does not have any effect on the battery reaction, or a material which has only a very slight effect, will cause a problem to decrease a volumetric density.

There are various methods of coating the current collector, but their sole object is to decrease the contact resistance between the current collector and the material relating to the battery reaction. However, practically, the resistances inside the electrode, such as a contact resistance between the particle, and a reaction resistance at a boundary between a particle and the electrolyte, are significantly larger than the contact resistance between the current collector and the material relating to the battery reaction.

As described above, no effective method for improving the rapid charge-discharge characteristics has been disclosed yet.

SUMMARY OF THE INVENTION

The object of the present invention is to provide a secondary battery which can be used in a wide range of applications by improving the rapid charge-discharge characteristics of the secondary battery.

The present invention is characterized in that, with a secondary battery comprising a positive electrode and a negative electrode which are separated with an electrolyte, wherein either the positive electrode or the negative electrode includes particles made of a material relating to charge-discharge reactions, the particles are composed of at least two phases, and at least one phase of the above two phases has fine pores.

The particles are composed of at least two phases, and at least one phase of the above two phases has fine pores which are formed by dissolution.

The fine pores are characterized in that they exist at the surface of the particle whereat the particle contacts the electrolyte. Because the fine pores contribute to the battery reaction, the fine pores may exist at least at the surface of the particle whereat the particle contacts the electrolyte.

The particles of the material relating to the charge-discharge reaction, which compose the battery electrode of the present invention, are characterized in that there are fine pores at the surface of the particles, an that the composition at surface of the fine pore differs from the composition at the surface of the particle other than the surface of the fine pore. The fine particles are so-called primary particles. An active coating can exist at the surface a fine pore which is formed by dissolution and the like, differing from the fine pore formed at an interval between particles by agglomerating the particles, due to chemical elements which exist in phases which has been dissolved or evaporated, and to chemical elements which exist at particle boundaries between the phase which has been dissolved and the other phase.

The particle is characterized in that it is composed of a plurality of phases, and that the fine pores are formed by dissolving or evaporating at least one of the plural phases, and at least one of transition metal elements exists at a surface of the fine pore. For instance, the transition metal element exists in a condition of coated film of an oxide or a hydroxide.

When the particle is composed of an alloy, the alloy is formed of at least two kinds of chemical elements, and the alloy comprises a first phase and at least a second phase which is precipitated in the first phase, and the particle has fine pores which are formed by dissolving or evaporating at least one phase of the second phase.

When a main component of the particle is carbon, the carbon is characterized in having at least one phase, and having fine pores, which are formed by dissolving or evaporating at least one of the phases at the surface of the carbon. The fine pores exist only at a plane which can be contacted with the electrolyte, and the fine pores may not exist at the interior of the particle which can not be contacted with the electrolyte. When the particle is composed of carbon and additive components, the previously described at least one phase may be composed of the additive components or a compound of the additive components with the carbon.

When the particle is composed of oxides or sulfides, the oxides or the sulfides contain at least two kinds of chemical elements, and the compounds comprise a first phase and at least a second phase which is precipitated in the first phase, and the particle has fine pores which are formed by dissolving or evaporating at least one phase of the second phase.

The particle is characterized in being composed of particles having an average diameter equal to or less than 2 mm, and having fine pores, of which the average diameter is in a range from $1/150$ to $1/2$ of the average diameter of the particle. The diameter is a so-called primary diameter. The material relating to the charge-discharge reaction of the present invention is in the form of particles, of which the diameter is at most 2 mm, preferably in a range from 20 nanometers to 500 microns. The particles are manufactured to be a porous electrode by one of various methods, such as causing the particles to adhere with an adhesive agent, pulverizing mechanically, sintering thermally, an agglomerating chemically. If the particle has a diameter larger than 2 mm, any significant effect for improving the characteristics can not be observed even if the fine pores relating to the present invention are provided. The advantages of the present invention become apparent with the active material particles having diameter preferably in a range from 20 nanometers to 500 microns.

The average diameter of the fine pores is in a range from $1/150$ to $1/2$ of the average diameter of the particles, preferably in a range from $1/50$ to $1/5$. If the average diameter of the fine pores is larger than $1/2$ of the average diameter of the particles, the holding power for the electrolyte decreases, and consequently, the amount of the electrolyte held by the fine pores is decreased, and the field area for the reaction is also decreased. On the other hand, if the average diameter of the fine pores is smaller than $1/150$ of the average diameter of the particles, air bubbles in the fine pores are hardly replaced with the electrolyte, and consequently, the amount of the electrolyte held by the fine pores is decreased, and the field area for the reaction is decreased.

The particle is characterized in that a total area of the surface occupied by the fine pores is in a range from 5% to 80% of the surface area of the particle.

The fine pores existing in the particle occupy the total surface area of the particle in a range from 5% to 80%, preferably a range from 10% to 50%. If the occupied surface area is smaller than 5%, the advantages of the improvement relating to the present invention is small. If the occupied surface area is larger than 80%, the volumetric density is decreased, because the packed density of the particles is decreased.

The particle is characterized in that the fine pores occupy the volume of the particle in a range from 0.2% by volume to 60% by volume of the particle.

The fine pores existing in the particle occupy the volume of the particle in a range from 0.2% by volume to 60% by volume, preferably a range from 1% by volume to 40% by volume. If the occupied volume is less than 0.2% by volume, the advantages of the improvement relating to the present invention is small. If the occupied volume is larger than 60%, the volumetric density is decreased, because the packed density of the active material is decreased.

When the negative electrode comprises hydrogen storage alloy particles, the particles are comprised of an alloy comprising at least one of the chemical elements selected from a group consisting of magnesium, lanthanum, cerium, praseodymium, neodymium, titanium, zirconium, hafnium, palladium, yttrium, scandium, calcium, aluminum, cobalt, chromium, vanadium, manganese, tin, boron, molybdenum, tungsten, carbon, lead, iron, nickel, potassium, sodium, and lithium. The particle also is composed of at least two phases, and has fine pores which are formed by dissolving at least one phase of the above described phases.

For instance, the phase to be dissolved is in a dispersed state in the mother phase as explained above. The phase to be dissolved can be a phase which is soluble in an alkaline solution. In accordance with the present invention, the phase formed by dissolusion is understood to include a phase which is dissolved with an acid, an alkali, an oxidizing agent, and a reducing agent, and a phase which is formed by contacting and evaporating with a reactive gas.

The above alloys (intermetallic compounds) can be prepared by an arc-melting or a high frequency melting, and subsequently, gradual cooling of the molten alloys to a temperature or holding the alloys at the temperature whereat a phase, which is soluble into an alkaline solution, can be obtained.

The phase to be solved in the negative electrode containing the hydrogen storage alloy particles preferably contains at least one metal selected from a group consisting of aluminum, vanadium, manganese, tin, boron, magnesium, molybdenum, tungsten, zirconium, potassium, sodium, lithium, nickel, and titanium in an amount at least 40% by weight. The phase wherein the content of the above component is within the above range is suitable for forming fine pores by dissolution, and preferable fine pores can be formed.

The phase to be solved can be a phase which is extremely soluble into an alkaline electrolyte.

The phase to be solved can be prepared by sintering or melting, or mixing by a mechanical alloying method or a mechanical grinding method. The objective negative electrode (or the particles forming the negative electrode) is prepared by adjusting the degree of alloying by controlling the rotations per unit time and the operating time in the mechanical alloying method or the mechanical grinding method so as to obtain the phase to be solved into the alkaline solution in a segregated condition, i.e. a not so uniform condition.

The fine pores may be formed by dissolving into the electrolyte. The electrolyte may be one generally used in a nickel metal hydride battery. The fine pores may exist only on a plane which contacts the electrolyte, and does not exist inside the particle where there is no contact with the electrolyte.

In accordance with the secondary battery relating to the present invention, the negative electrode may be composed of carbon as a main component, the carbon contains at least a phase which is composed of at least one of the chemical elements or oxides of a chemical element which is selected from a group consisting of iron, nickel, sulphur, silicon, tin, lithium, sodium, potassium, and lead, and one of the above phases comprises fine pores which are formed by dissolution or evaporation with at least one of an acid, an alkali, an oxidizing agent, or a reducing agent. The negative electrode is preferably suitable for use as a negative electrode of lithium secondary battery, for instance.

In accordance with the secondary battery relating to the present invention, the positive electrode or the negative electrode is composed of a conductive polymer, the conductive polymer contains at least a phase which is composed of the at least one of the chemical elements or oxides of chemical element which is selected from a group consisting of iron, nickel, sulphur, silicon, tin, lead, lithium, sodium, and potassium, and one of the above phases comprises fine pores which are formed by dissolution or evaporation with at least one of an acid, an alkali, an oxidizing agent, or a reducing agent. The positive electrode or the negative electrode is preferably suitable for use as a positive electrode or a negative electrode of a lithium secondary battery, for instance.

In accordance with the secondary battery relating to the present invention, the negative electrode is characterized in being that it is composed of an alloy, and that the alloy contains at least one of the element selected from a group consisting of nickel, silicon, germanium, magnesium, copper, and manganese, the alloy is composed of at least two phases, and one of the phases comprises fine pores which are formed by dissolution or evaporation with at least one of an acid, an alkali, an oxidizing agent, or a reducing agent. The negative electrode is preferably suitable for use as a negative electrode of a lithium secondary battery, for instance.

In accordance with the secondary battery relating to the present invention, the positive electrode is characterized in that it comprises a first phase composed of an oxide containing at least one of the chemical elements selected from a group consisting of lead, manganese, vanadium, iron, nickel, cobalt, copper, chromium, molybdenum, titanium, niobium, tantalum, strontium, and bismuth, or a sulfide containing at least one of the chemical elements selected from a group consisting of titanium, molybdenum, iron, tantalum, strontium, lead, niobium, copper, nickel, vanadium, bismuth, and manganese, or a complex oxides compound or a complex sulfides compound containing the above oxides and lithium or the above sulfides and lithium, and a second phase composed of an oxide containing at least one of the chemical elements or oxides selected from a group consisting of aluminum, tin, boron, magnesium, potassium, and sodium, and that one of the above two phases comprises fine pores which are formed by dissolution or evaporation with at least one of an acid, an alkali, an oxidizing agent, or a reducing agent. The positive electrode is preferably suitable, for instance, for use as a positive electrode of a lithium secondary battery.

In a method for manufacturing the positive electrode and the negative electrode, which are used in a secondary battery, wherein the positive electrode and the negative electrode are arranged to be separated by an electrolyte, the present invention is characterized in that it comprises the steps of forming the negative electrode by compacting particles of a material which relates to the battery reaction, the negative electrode comprises a first phase and at least a second phase which exists in the first phase, and forming fine pores by dissolving or evaporating at least a phase of the second phase with any one of an acid, an alkali, an oxidizing agent, or a reducing agent.

For instance, the method is characterized in that it comprises the steps of dispersing particles of the material relating to the battery reaction, wherein a first phase exists and a second phase is dispersed in the first phase, by chemical reaction of the components in the first phase with the components in the second phase for dispersing the second phase into the first phase, pulverizing the first phase wherein the second phase is dispersed, forming fine pores at a surface of the particle by dissolving or evaporating the second phase in the pulverized particles with any one of an acid, an alkali, an oxidizing agent, or a reducing agent, and fabricating the particles having the fine pores to form a plate.

In the above method, the chemical reaction can be performed by a mechanical alloying method, a solid reaction, a liquid reaction, a gaseous reaction, and a synthetic method using atomized gas (nebulizing at a temperature near a precipitating temperature of the second phase, etc.). In the above case, the conditions such as particle size, the amount of the second phase, and the others are the same as previously designated.

The particles having the fine pores can be fabricated to form a plate by a method comprising the steps of mixing the components for the first phase and the components for the second phase, melting at least the components for the first phase, cooling and pulverizing the mixture, and forming fine pores at a surface of the particle by dissolving or evaporating the second phase in the pulverized particles with any one of an acid, an alkali, an oxidizing agent, or a reducing agent. Naturally, the fine pores can be formed by evaporating the second phase selectively by contact with a reactive gas, as previously described.

The second phase can be contained in the first phase by adding the components for the second phase into the molten components for the first phase. The electrode can be fabricated to form a necessary shape, such as a plate, after forming the fine pores by the steps of preparing the second phase (a precipitated phase) with an alloy, an intermetallic compound, or chemical elements, all of which are selectively soluble with any one of an acid, an alkali, an oxidizing agent, or a reducing agent, and dissolving the second phase with the agent which can dissolve the second phase to form the fine pores. Otherwise, the electrode is fabricated first to form a necessary shape, and subsequently, the fine pores can be formed by dissolving the second phase.

The present invention can be applied to a secondary battery which is composed of a positive electrode, a negative electrode, and an electrolyte which is distributed in the battery. A separator can be provided between the positive electrode and the negative electrode if it is necessary. Particularly, the present invention is preferably applicable to a sealed type battery, such as a nickel-metal hydride battery and a lithium battery.

The alloys which are used in accordance with the present invention must be understood to include so-called intermetallic compounds. For instance, the present invention can be a secondary battery composed of a positive electrode and a negative electrode made of a hydrogen storage alloy, both of which are contained in a vessel with an electrolyte. The negative electrode made of a hydrogen storage alloy is preferably formed by compacting the hydrogen storage alloy particles. A separator can be arranged between the positive electrode and the negative electrode.

In accordance with application of the present invention to the negative electrode made of the hydrogen storage alloy, a catalytic effect of the hydrogen occluding reaction can be obtained. The rapid charge-discharge characteristics of the battery can be improved and a long battery life can be obtained by the catalytic effect of an active species (it can be assumed to be an active chemical element having a vacancy and an unpaired electron) which remains in the fine pores.

The present invention can be applied to a secondary battery which is composed of a positive electrode and a negative electrode, both of which are contained in a vessel with a non-aqueous electrolyte, wherein the charge-discharge reaction is performed by holding and releasing alkaline metal ions (for instance, lithium ions) at the positive electrode and the negative electrode.

In a case where carbon or a conductive polymer is used for the negative electrode, taking the carbon for example, lithium is inserted into the carbon at an edge portion of the six-membered ring, and an intercalation reaction proceeds. Owing to the fine pores, a large number of the edge portion of the six-membered ring, so-called terminal portions, exist, and the react on is facilitated. Accordingly, the rapid charge-discharge characteristics of the battery can be improved and an increased capacity of the battery can be obtained.

In a case when a conductive polymer is used for the positive electrode, the amount of the electrolyte absorbed into the fine pores can be increased, because the active material at the positive electrode is an anion in the electrolyte, and accordingly, the charge-discharge reaction can proceed smoothly.

In a case where an oxide or a sulfide of metal is used for the positive electrode, defects can be generated by adding a transition metal into the oxide or the sulfide to replace the metal in the positive electrode with the transition metal. As lithium can be filled into the defect, an increase in the defect enable an increase in the reaction sites of the lithium, and consequently, the capacity of the battery can be increased.

The shapes of the particles of the material relating to the battery reaction and of the fine pores can be spherical, oval, conical, fibrous, doughnut-like, cubic, rectangular parallelepiped-like, and amorphous.

For instance, the present invention can be applied to the following electrodes of batteries. Naturally, if the performance of any batteries can be improved by forming the fine pores relating to the present invention, the present invention can be applied to those batteries even if they are not particularly described here.

As for the material relating to the charge-discharge reaction at the negative electrode of a nickel metal hydride battery, a hydrogen storage alloy composed of the following components can be used. Furthermore, the following alloys and the like (the first phase) having the phase to be dissolved (the second phase) relating to the present invention can be used:

An alloy which is composed of components of nickel combined with at least one element selected from a group consisting of magnesium, lanthanum, cerium, neodymium, praseodymium, titanium, zirconium, hafnium, palladium, yttrium, scandium, and calcium; and An alloy which is composed of components of the above alloy combined with at least one element selected from a group consisting of aluminum, calcium, chromium, vanadium, manganese, tin, barium, molybdenum, tungsten, carbon, lead, iron, potassium, sodium, and lithium.

For instance, the present invention can be applied to alloys composed of the following components:

(La—Ce—Nd—Pr)—(Ni—Mn—Al—Co),
(La—Ce—Nd—Pr)—(Ni—Mn—Al—Co—B),
(La—Ce—Nd—Pr)—(Ni—Mn—Al—Co—W), an
(La—Ce—Nd—Pr)—(Ni—Mn—Al—Co—Mo).

Here, the ratio of a sum of (La—Ce—Nd—Pr) to a sum of (Ni—Mn—Al—Co—X), wherein X is nil, or any one of B, W, or Mo, is within a range of 1:4.5~5.5 by atomic ratio.

Furthermore, an alloy composed of (Zr)—(Ni—V—Mn—Z) can be used. Here, Z is nil, or at least one of Co, Fe, Cr, and Sn, such as Co—Fe, Co—Sn, Cr—Fe, Co—Cr, and the like, and a ratio of (Zr) to a sum of (Ni—V—Mn—Z) is within a range of 1:1.5~2.5 by atomic ratio. Arbitrarily, Ti can be added to (Zr). In this case, the above atomic ratio must be calculated based on a sum of (Zr—Ti).

Furthermore, an alloy composed of (Mg—Zr)—(Ni—Al—Mn—Co) can be used. The ratio of a sum of (Mg—Zr) to a sum of (Ni—A—Mn—Co) is within a range of 2:0.5~5 by atomic ratio. Arbitrarily, Ti can be added to (Mg—Zr). In this case, the above atomic ratio must be calculated based on a sum of (Mg—Zr—Ti).

As for phases to be dissolved in the hydrogen storage alloy, the phases composed of the following components, for instance, can be used:

A phase composed of V and Ti to which is added at least any element selected from a group consisting of B, C, Cr, W, Mo, Sn, Mg, K, Li, or Na;

A phase composed of Al and Mn to which is added at least any element selected from a group consisting of B, W, or Mo; and A phase composed of any combination of Ni—Ti, Zr—Ni, Zr—Mn, B—Al—Co, B—Ni—Mn, and the like.

As for the materials contributing to the charge-discharge reaction at the positive electrode of the lithium battery, the following compounds (alloys) can be used. Furthermore, the following compounds (first phase) including the above phase to be dissolved (second phase) can be used:

A compound (alloy) composed of oxygen and at least one of the following elements, lead, manganese, vanadium, iron,, nickel, cobalt, copper, chromium, molybdenum, titanium, niobium, tantalum, strontium, and bismuth (the compounds can be so-called a complex oxides);

A compound (so-called sulfide) composed of sulfur and at least one of the following elements: lead, manganese, vanadium, iron, nickel, copper, molybdenum, titanium, niobium, tantalum, strontium, and bismuth;

A compound (alloy) composed of the same composition as the above compounds containing oxygen, or sulfur, except that lithium is additionally added (the compounds can be so-called oxides, or sulfides);

A conductive polymer (for instance polyaniline, polyparaphenylene, polyacene, polypyrrol), or the conductive polymer to which is added at least one of the following elements: iron, silicon, sulfur, copper, lead, nickel, and vanadium; and Carbon, or carbon to which is added with at least one of the following elements: iron, silicon, sulfur, copper, lead, nickel, and vanadium.

As for the materials contributing to the charge-discharge reaction at the positive electrode of the lithium battery, the compounds having the following composition can be used:

$LiCoO_x$, $LiMnO_x$, $LiNiO_x$, $LiFeO_x$, $LiNi_{0.5}Co_{0.5}O_x$, $LiCo_{0.5}Mn_{0.5}O_x$, $LiNi_{0.5}Mn_{0.5}O_x$, $LiNi_{0.5}Fe_{0.5}O_x$, $LiFe_{0.5}Co_{0.5}O_x$, $LiFe_{0.5}Mn_{0.5}O_x$, $LiMn_2O_{2x}$, $TiS_x$, $MoS_x$, $LiV_3O_{2x}$, or $CuV_2O_{3x}$, where, x is in a range from 1.5 to 2.5.; and $LiNi_mCo_nO_x$, $LiCo_mMn_nO_x$, $Ni_mMn_nO_x$, $LiNi_mFe_nO_x$, $LiFe_mCo_nO_x$, $LiFe_mMn_mO_x$, where, (m+n) is in a range from 0.8 to 1.3, not necessarily to be evenly shared as 0.5 each, and x is in a range from 1.5 to 2.5.

As for the materials contributing to the charge-discharge reaction at the negative electrode of the lithium battery, the compounds (alloys) composed of the following components can be used. Furthermore, the following compounds (first phase) including the above phase to be dissolved (second phase) can be used:

Carbon (carbon black, furnace black, pitch group carbon, meso phase group carbon, PAN group carbon, glassy carbon, graphite, amorphous carbon, and a combined material of the above carbons);

A compound composed of the above carbon and at least an element selected from a group consisting of iron, silicon, sulfur, copper, lead, nickel, and vanadium;

A conductive polymer (for instance, polyaniline, polyacene, and polypyrrol);

A compound composed of the above conductive polymer and at least an element selected from a group consisting of iron, silicon, sulfur, copper, lead, nickel, and vanadium; and An alloy composed of a combination of at least an element selected from a group consisting of manganese, nickel, copper, calcium, and magnesium, and at least an element selected from a group consisting of germanium, silicon, tin, and lead. For instance, Si—Ni, Ge—Si, Mg—Si, Si—Ni—Ge, Si—Ni—Mg, Si—Ni—Mn, Si—Ni—Cu, and the like can be used practically.

When the material contributing to the charge-discharge reaction, which is composed of an alloy, is prepared, the components of the alloy are melted, and subsequently, a precipitated phase (segregated phase) to be dissolved with an acid or an alkali is formed by an aging treatment or by controlling the cooling speed (for instance, gradual cool). The components for forming the alloy can be adjusted by adding additive elements in order to disperse the precipitated phase having a desired size. The additive elements desirably have an effect to induce the precipitation. For instance, the phase to be dissolved is formed so as to disperse in the prepared alloy (if the additive element exists as a particle, it is a primary particle).

Further, the material composed of an alloy can be prepared by mixing the components using a mechanical alloying method or a mechanical grinding method. The objective negative electrode (or particles to form the negative electrode) is manufactured so as not to precipitate the phase to be dissolved so homogeneously by controlling the degree of alloying by regulating the rotation per unit time, and the operating time in the mechanical alloying method, or the mechanical grinding method. The phase to be dissolved is preferably dispersed in the mother phase, and has a desired size.

When the material contributing to the charge-discharge reaction, which is composed of carbon or a conductive polymer, is prepared, the components for the phase to be dissolved are mixed with other raw materials, and the components are preferably melted to disperse in the raw materials, such as carbon or the conductive polymer (if the raw material exists as a particle, it is a so-called primary particle), and are cooled to form the material. This method can be applied even if the material contributing to the charge-discharge reaction is one of the oxides (complex oxides) or sulfides (complex sulfides).

For instance, the components for the phase to be dissolved are mixed with carbon or a the conductive polymer, and the mixture is treated by heating to melt and to disperse the material to be dissolved into the carbon or the conductive polymer. The temperature of the heat treatment is preferably in a range from 300° C. to 3500° C. When the material is used for the positive electrode of a lithium battery, the temperature of the heat treatment is preferably in a range from 300° C. to a few hundreds ° C., and when the material is used for the negative electrode, the temperature of the heat treatment is preferably in a range from 1000° C. to 3500° C.

For instance, a material relating to the charge-discharge reaction (so-called active material), which is suitable for the battery, can be obtained by forming the fine pores by dissolving with an acid, and subsequent heat treatment. Instead of the above dissolution, evaporation by contact with a reactive gas can be used. The present invention is hardly applicable to the material contributing to the charge-discharge reaction (if it exists as a particle, it is a so-called primary particle), wherein the components of the material are distributed homogeneously as a whole by a designated heat treatment (for instance, homogenizing treatment, etc.). The precipitated phase (second phase), which is more soluble by an acid or an alkali than the mother phase (first phase), is preferably dispersed.

As explained above, the phase to be dissolved can be formed by precipitation, if the material is composed of an alloy. If the material is composed of a carbon or a conductive polymer, the phase to be dissolved can be included as particles in the mother phase (first phase) composed of the carbon or the conductive polymer.

The electrode relating to the present invention can be formed as a porous electrode by any method selected from adhering the particle with an adhesive agent, mechanical compacting, thermal sintering, or chemical agglomerating.

The electrode particularly suitable for the present invention is preferably applied to an electrode, wherein the material contributing to the charge-discharge reaction in the electrode is a so-called intercalation type. The advantages of the fine pores relating to the present invention is not sufficiently realized when the charging and discharging are repeated, if the electrode is a so-called dissolution-precipitation type, wherein components of the material contributing to the charge-discharge reaction in the electrode dissolve from the surface of the electrode into the electrolyte by charge-discharge reaction.

As the acid, the alkali, the oxidizing agent, and the reducing agent, for dissolving the material to form fine pores according to the present invention, the following reagents can be used. But, the following list of reagents is provided by way of example to describe the present invention in detail, and is not meant to restrict the scope of the present invention:

Acids: nitric acid, fluoric acid hydrochloric acid, sulfuric acid;
Alkalis: potassium hydroxide, sodium hydroxide;
Oxidizing agents: sodium hypochlorite, potassium hypochlorite, hydrogen peroxide aqueous solution;
Reducing agents: formalin, sodium boron hydride, potassium hypophosphite, sodium hypophosphite.

As gases used for forming the fine pores by evaporating the material, a reactive gas such as halogen and the like can be used. For instance, a halogen gas such as $F_2$, $Cl_2$, and $Br_2$, is brought into contact with the phase to be evaporated to evaporate the phase selectively.

In accordance with the present invention, the rapid charging characteristics and rapid discharging characteristics of secondary batteries are significantly improved. Furthermore, an increase in the capacity and life of the batteries can be realized.

The material which contributes to the charge-discharge reaction (if it exists as a particle, it is a so-called primary particle) has fine pores formed by dissolution with an acid or an alkali. In accordance with the present invention, packing density of the material contributing to the charge-discharge reaction in the eletrode can be increased higher than the packing density of the material contained in an electrode prepared by compression or fabrication of powder, wherein a specific surface of the material is increased by being provided with the fine pores formed in intervals between particles, or being provided with a deposit (for instance, carrier, etc.) on a surface of primary particles. Accordingly, the capacity of the battery can be increased.

Because the electrolyte can be retained in the fine pores, the charge-discharge reaction can proceed smoothly The particle which is provided with the fine pores relating to the present invention firstly differs from the particles, which are provided with metallic powder or catalytic powder, in an increased specific surface area of the material relating to the charge-discharge reaction, and a widely spread reaction field. Accordingly, the rapid charging and discharging reaction proceeds smoothly. The particles having fine pores relating to the present invention can contribute to the reaction sufficiently. Accordingly, in comparison with the electrode which is treated only at the surface by heating to a high temperature after fabrication, the electrode relating to the present invention hardly will cause a current concentration etc, and an extended duration time can be obtained.

The fine pores relating to the present invention differ from fine pores which are composed of intervals between the particles, the intervals are formed by dissolving phases which are soluble in an extremely reactive agent, such as an acid, an alkali, an oxidizing agent or a reducing agent, and the fine pores relating to the present invention can increase further the reactivity of the particles because an inactive film (for instance, an insulating film), such as an rigid oxidized coating film which is usually generated, is hardly formed. A coating film having a strong activity (for instance, a conductive oxidized coating film), which is not so rigid as an oxidized coating film usually formed on the surface at periphery of the fine pores, is generated. The surface of the fine pores generated by dissolving the phases has a discontinuous and non-equilibrium atomic arrangement. Accordingly, defects and vacancies are generated, and an electronically charged condition positively or negatively is formed, and consequently, the surface is deemed to contribute to an increase in activity.

Depending on the kinds of chemical elements existing in the phase to be dissolved or in the particle boundary between the phase to be dissolved and another phase, the dissolving speed varies significantly in a short time, and consequently, the composition at the surface of the fine pore changes to an active layer which has a composition different from the composition before the treatment. Therefore, the surface of the fine pore has a strong activity, because the surface is not only a surface of fine pores, but also has electronic vacancies and positive holes, or forms a catalytic layer which is etched delicately or an unstable layer (for instance, the previously described charged layer). Accordingly, the electrolyte can be retained in the fine pores by not only a capillary action, but also an electronic absorption, and the reaction speed is increased by catalytic activation of the reactive materials. As explained above, the fine pores relating to the present invention differ from the fine pores formed in intervals between particles of a porous electrode.

The fine pores relating to the present invention are formed at the surface of the particle whereon a dissolving agent contacts, because the fine pores are formed by dissolving the phases to be dissolved (secondary phase, or precipitated phase) with a dissolving agent, such as an acid, an alkali, an oxidizing agent, or a reducing agent. For instance, the fine pores exist only on the surface which can be contacted by the electrolyte, and an active reaction field is formed. Accordingly, the composition of the phase to be dissolved, which exists in the closed portion inside the particle and has not been dissolved, remains inside the particle in an unchanged condition, and the existence of the phase to be dissolved is readily determined by analysis of the chemical elements. As the phase to be dissolved is formed for being dissolved, this portion contributes to the charge-discharge reaction not at all, or with a small effect or a small capacity. Therefore, in order to make the remaining amount of the composition of the phase to be dissolved as small as possible, it is important to select an appropriate dissolving condition of the dissolving agent. In order to dissolve more certainly, it is desirable to dissolve the phase to be dissolved certainly with heating applied externally, such as a warm acid or a warm alkali. When the electrolyte is acidic or alkaline and can dissolve the phase to be dissolved, the phase (secondary phase, or precipitated phase) to be dissolved, which has not been dissolved in a previous dissolving operation, is dissolved into the electrolyte in a battery by contact with the electrolyte. Therefore, the composition of the phase (secondary phase, or precipitated phase) to be dissolved is dissolved into the electrolyte, and its existence can be confirmed by analysis of the electrolyte.

In a case when the phase to be dissolved can be dissolved into the electrolyte, even if breakage, such as a fracture of the particle, is generated by operation of the battery, the new fine pores existing at the surface of the particle composed of the material relating to the charge-discharge reaction can be re-formed by contacting a new fractured surface of the particle with the electrolyte, and consequently, the charge-discharge reaction can be maintained preferably.

The composition dissolved into the electrolyte is not necessarily recovered positively by utilizing an effect such as precipitating the components at a desirable place. The advantages of the present invention can be realized only by forming the fine pores by dissolution.

The composition of the electrolyte and the reaction products can be retained inside the fine pores. In this case, even if the material relating to the charge-discharge reaction in the electrode is broken (including fracturing, breakage etc.) during the charge-discharge reaction and a new cleaved surface contacting the electrolyte is generated, the phase to be dissolved existing at the new cleaved surface contacts the electrolyte, and new fine pores can be re-formed.

BRIEF DESCRIPTION OF THE DRAWINGS

These and other objects, features, and advantages of the present invention will be understood more clearly front the following detailed description with reference to the accompanying drawings, wherein:

FIG. 7 is a graph indicating a relationship between a ratio of a cross sectional area of fine pores to a surface area of particles and their volumetric ratio obtained by the embodiment 5, and the comparative examples 8 and 9; and FIG. 8 is a graph indicating a relationship between a ratio of a total volume of fine pores to a total volume of particles and their volumetric ratio obtained by the embodiment 5, and the comparative examples 8 and 9.

DESCRIPTION OF THE PREFERRED EMBODIMENTS

The present invention is explain in detail referring to embodiments, wherein the present invention is applied to a secondary battery. The present invention can be applied to power sources for apparatus having large power consumption such as high performance personal computers, electric automobiles which requires a high power, power sources for electric power storage, etc.

Embodiment 1

Figure 1:
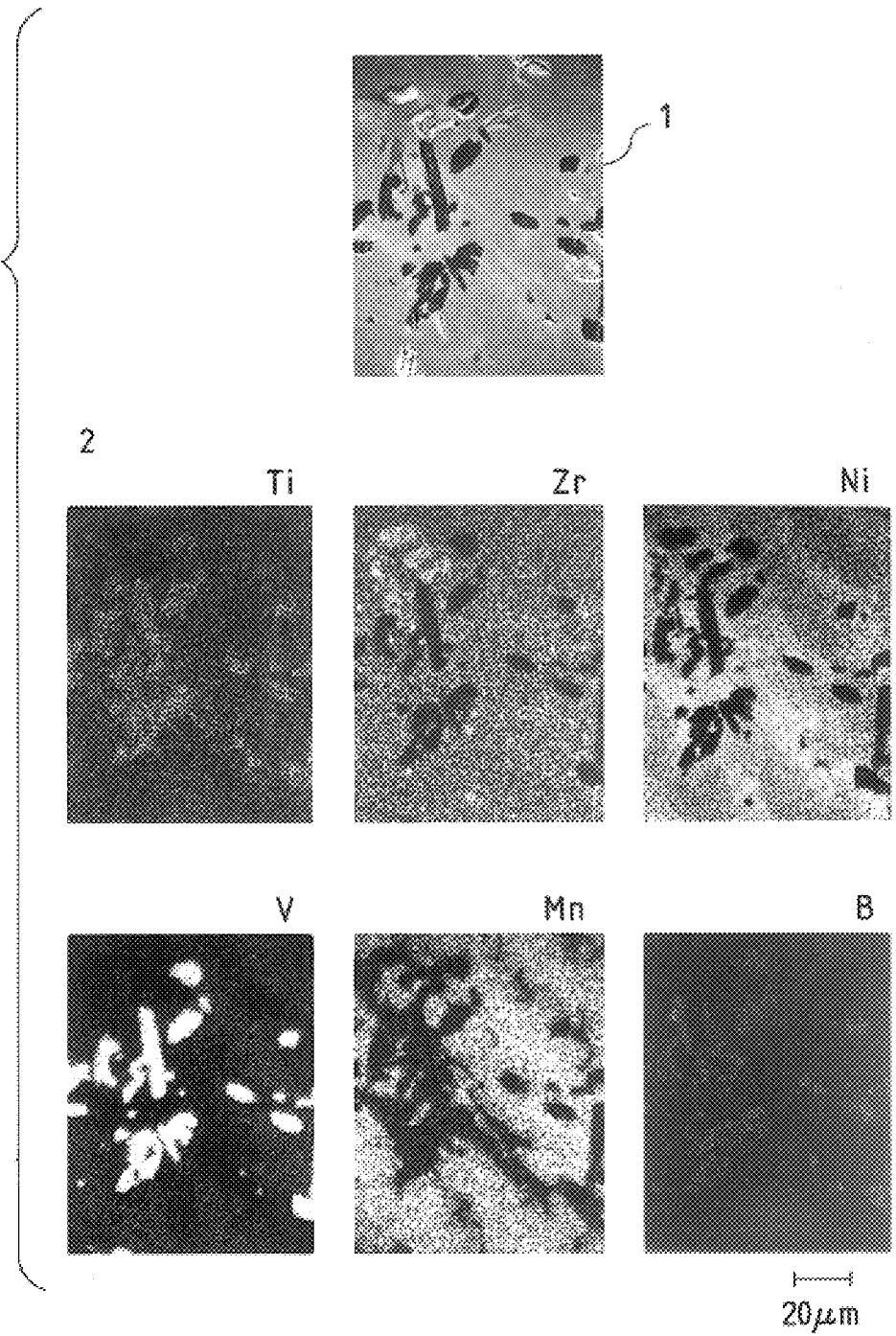
FIG. 1 is a set of photographs indicating an analytical result of segregated phases obtained by the embodiment 1.
Figure 2:
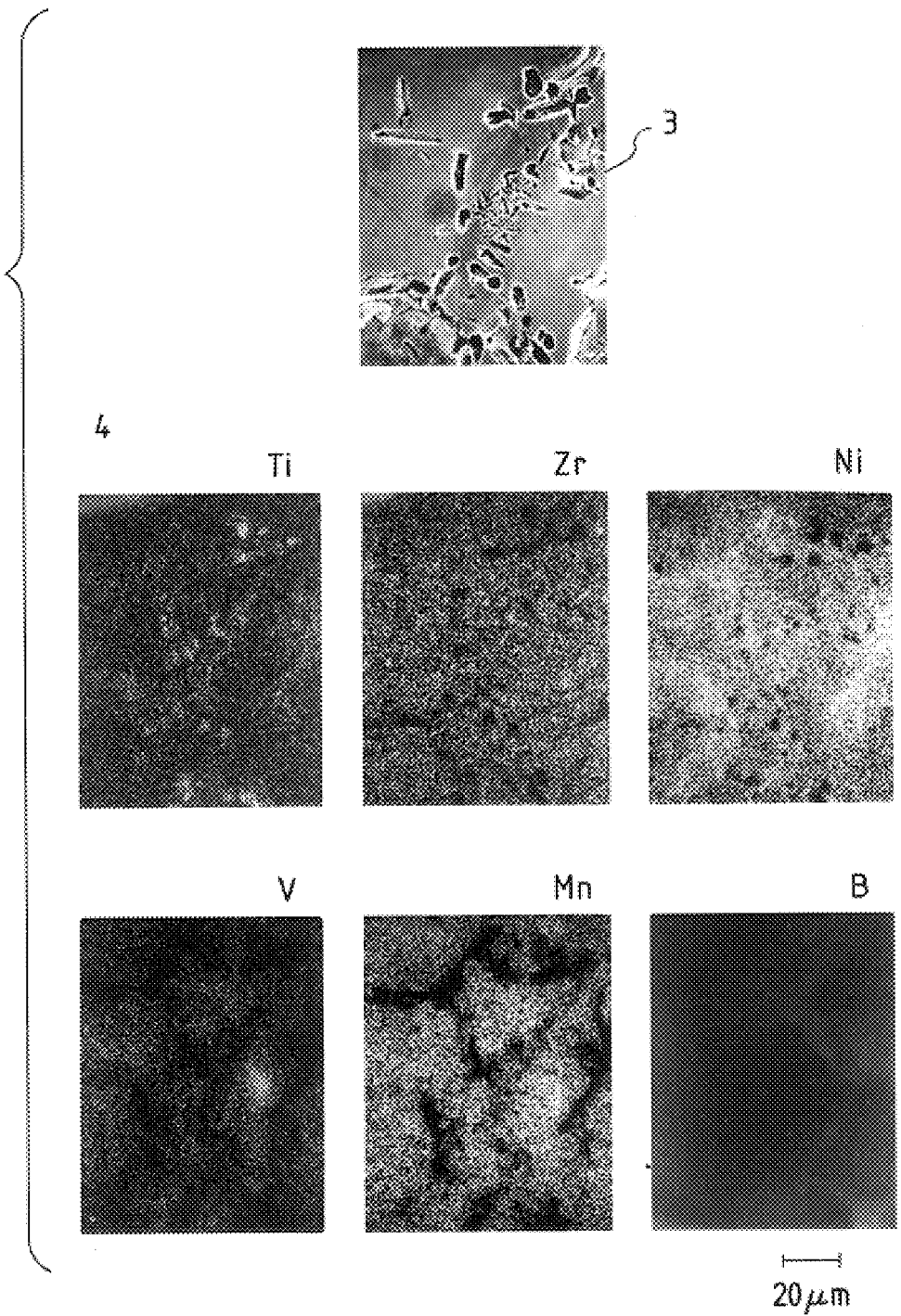
FIG. 2 is a set of photographs indicating an analytical result of segregated phases obtained by the embodiment 1 after melting.
Figure 3:
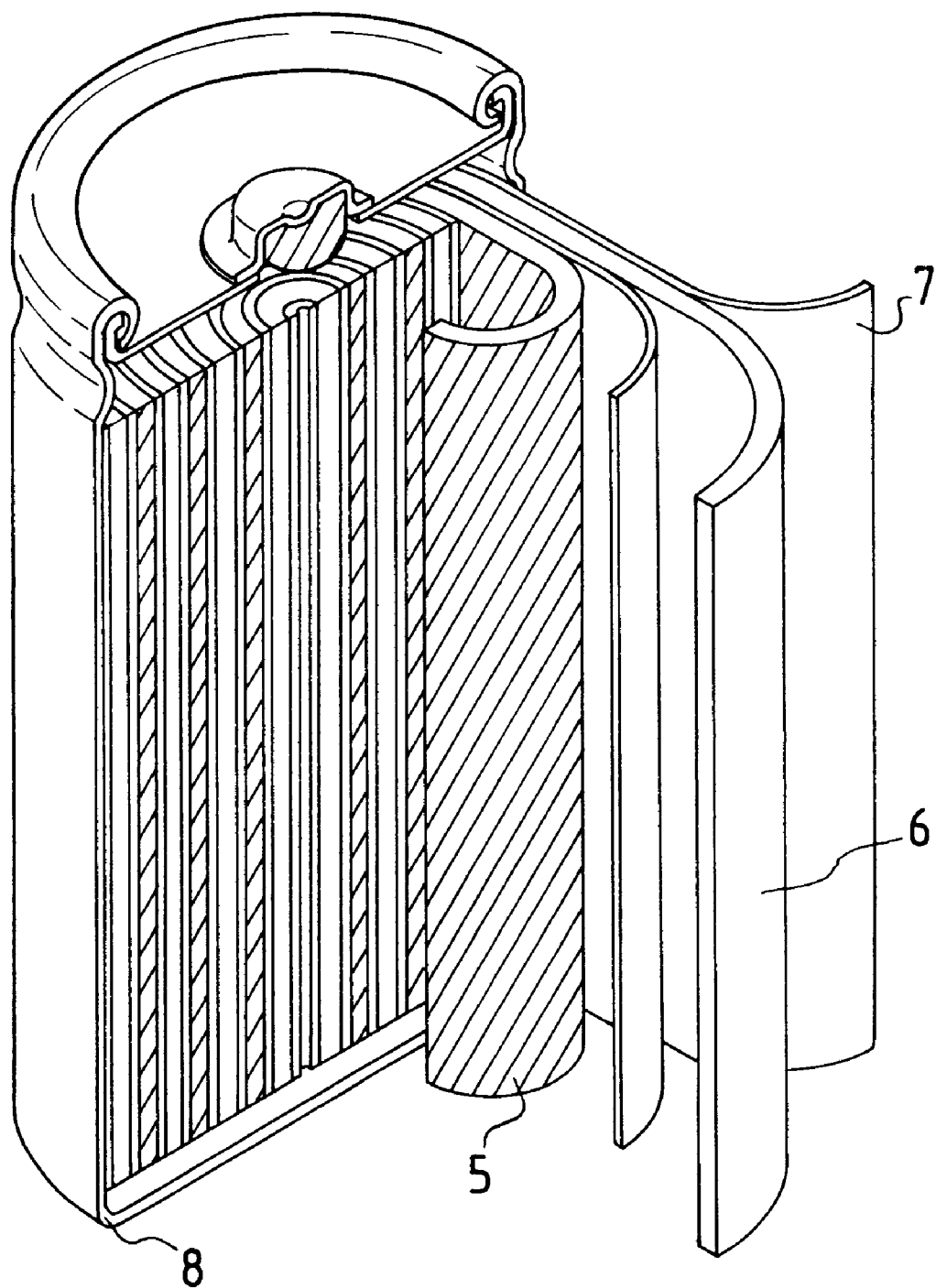
FIG. 3 is a schematic perspective view, partially in section, illustrating a structure of a sealed battery.

An alloy of $Ti_{0.2}Zr_{0.8}Ni_{1.1}Mn_{0.6}V_{0.2}B_{0.03}$ was used as a hydrogen storage alloy for forming a negative electrode. The alloy was obtained by melting at a temperature in a range of 1100° C. to 1500° C., cooling at a speed in a range of 0.01° C./min. to 0.5° C./min., and subsequently, annealing at a temperature in a range of 300° C. to 500° C. for 2 hours. The alloy was pulverized to particles having an average diameter of 50 microns. The surface of the alloy particle was observed by scanning electron microscope-electron beam diffraction (SEM-EDX), and it was revealed that the alloy forms a segregated phase of V, B, and Ti having an average diameter of 5 microns. The distributing condition of the above phase is shown in FIG. 1. Then, the alloy was treated with 30% by weight KOH aqueous solution at 70° C. for 2 hours, and subsequently, the alloy was washed with water sufficiently. The surface of the alloy particle was observed again by the SEM-EDX. The result of the observation is shown in FIG. 2. The V and B in the segregated phase having an average diameter of 5 microns were dissolved completely, and Ti remained in the fine pores. It reveals a discontinuity in the composition of the alloy and the peripheral portion of the fine pores, which has been generated depending on the difference in dissolving speed of the respective chemical elements. At that time, the fine pores occupied 15% of the total particle surface, and 5% of the total particle volume. The same result was obtained by reacting and evaporating the segregate phase with flowing a gas, such as chlorine or fluorine, other than the dissolving treatment with warm KOH aqueous solution. Then, an electrode made of metal hydride was formed by the steps of mixing hydroxypropylmethyl cellulose with the alloy particles as a binder, packing the mixture into a foamed nickel base, and rolling the packed nickel base with a roller press to a designated thickness. As a nickel electrode, a paste electrode using foamed nickel having a porosity of 95% as an electrode base was used. A sealed nickel-metal hydride battery of AA-size was prepared with the above electrodes. A structure of the prepared battery is shown in FIG. 3. A positive electrode and a negative electrode were rolled up with a separator made of unwoven cloth of polypropylene resin of 0.17 mm thickness, which was inserted between the electrodes, and the rolled electrodes were contained in a battery can. As for an electrolyte, a 31% by weight KOH aqueous solution mixed with a small amount of LiOH was used. The battery capacity was designed to be 900 mAh. The battery was charged to 150% of the rated capacity with at a rate 0.3 C or 3 C (C is a rat of discharge, hereinafter), and after a quiescent time of one hour, the battery was discharged to a terminal voltage of 1.0 V at 0.3 C or 3 C. A discharging capacity of the battery was determined in a case where the battery was charged at 0.3 C and, subsequently, discharged at 0.2 C. Furthermore, ratios of discharging capacities were determined, taking the discharging capacity of 0.2 C discharging after charging at 0.3 C as 100, in the cases of 3 charge–0.2 C discharge, and of 0.3 C charge–3 C discharge. The discharging capacity of the 0.3 C charge–0.2 C discharge case was as large as 1050 mAh, and the cycle life was as long as 520 cycles. When the discharging was changed to 3 C, the discharge capacity decreased to 95% of the above 0.3 C charge–0.2 C discharge case. Similarly, when the charging was changed to 3 C, the discharge capacity decreased to 92%.

Comparative Example 1

Figure 4:
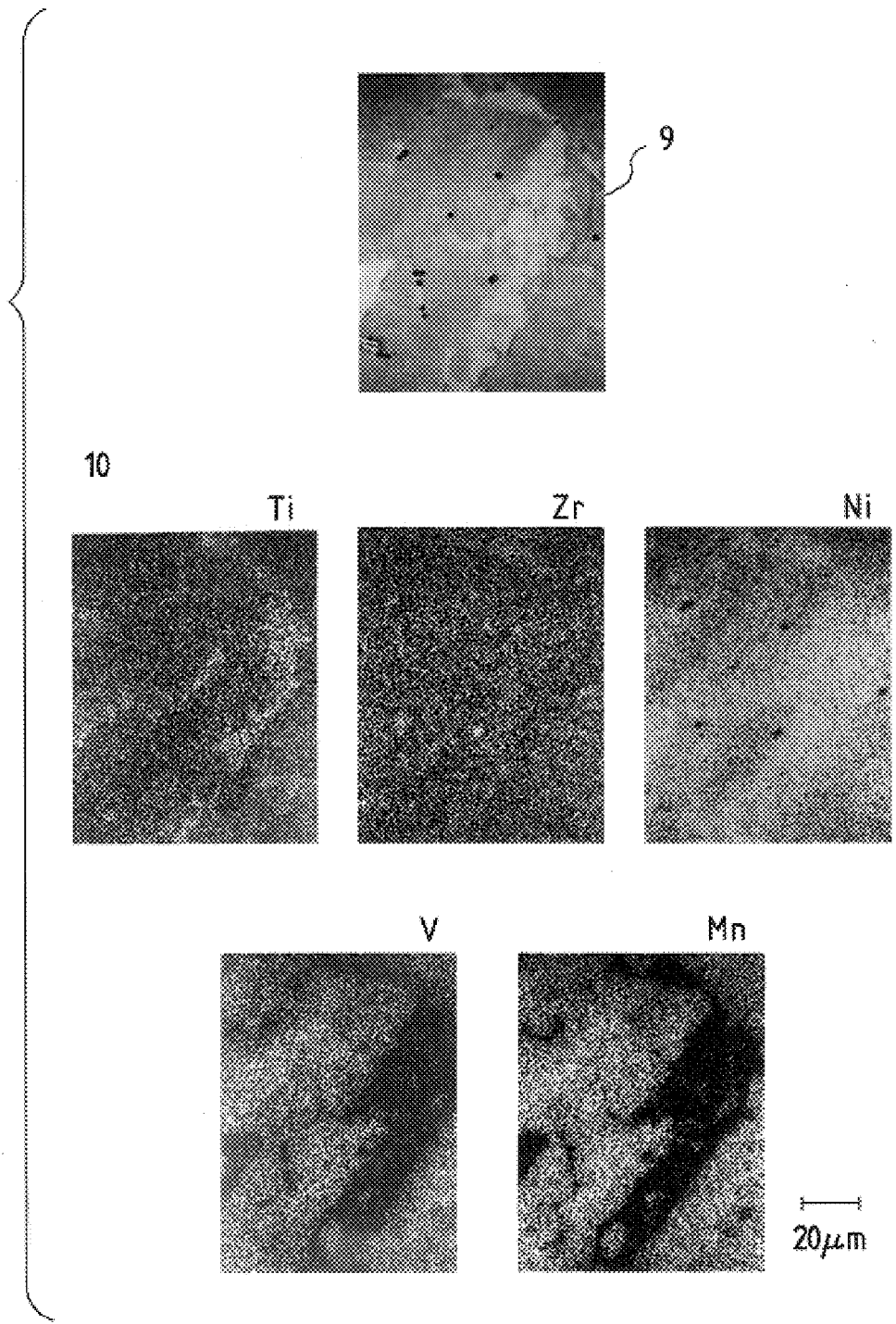
FIG. 4 is a set of photographs indicating an analytical result of the alloy obtained by the comparative example 1.
Figure 5:
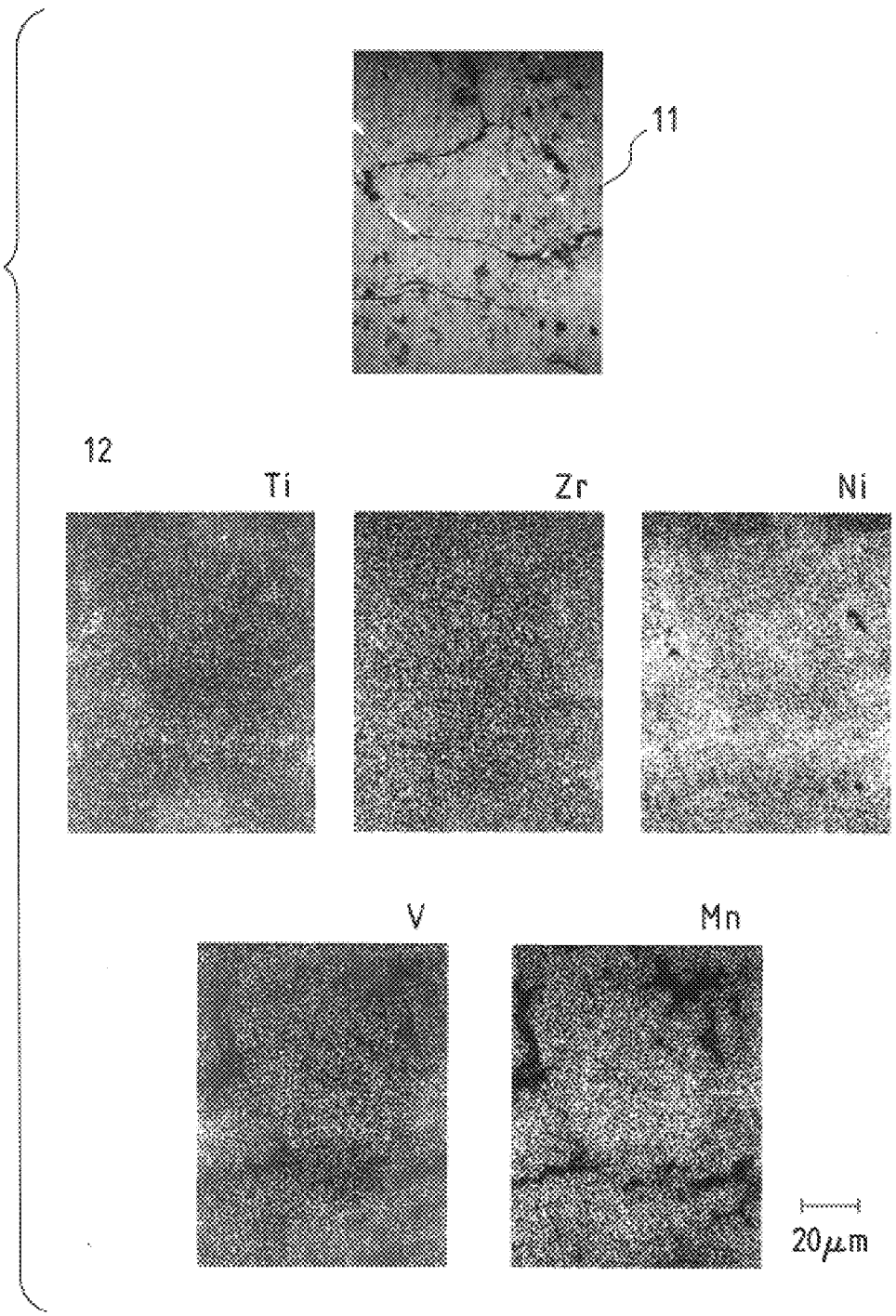
FIG. 5 is a set of photographs indicating an analytical result of the alloy obtained by the comparative example 1 after melting.

An alloy of $Ti_{0.2}Zr_{0.8}Ni_{1.1}Mn_{0.6}V_{0.2}$ was used as a hydrogen storage alloy for forming a negative electrode. The alloy was obtained by melting at a temperature in a range of 1100° C. to 1500° C., and subsequently, by homogenizing using heating at 1050° C. for 3 to 10 hours in an argon gas atmosphere. The alloy was pulverized to particles having an average diameter of 50 microns. The surface of the alloy particle was observed by scanning electron microscope-electron bean diffraction (SEM-EDX), and it was revealed that the alloy did not form any segregated phase. The distributing condition of the chemical components is shown in FIG. 4. Then, the alloy was treated in the same way as the embodiment 1 in order to form fine pores. However, the fine pores could not be formed as shown in FIG. 5. Then an electrode made of metal hydride was formed by the same steps as the embodiment 1, and a sealed nickel-metal hydride battery of AA-size was prepared with the above electrodes. A discharging capacity of the battery was determined. When the battery was charged at 0.3 C and discharged at 0.2 C, the discharging capacity was as large as 950 mAh, but the cycle life was as short as 380 cycles. When the discharging was changed to 3 C, the discharge capacity decreased to 45%, and when the charging was changed to 3 C, the discharge capacity decreased to 56%.

Comparative Example 2

An alloy of $Ti_{0.2}Zr_{0.8}Ni_{1.1}Mn_{0.6}V_{0.2}$ was used as a hydrogen storage alloy for forming a negative electrode, and the alloy particles having an average diameter of 50 microns were prepared by the same method as the comparative example 1. Then, an electrode was formed by the steps of mixing hydroxypropylmethyl cellulose with the alloy particles as a binder, packing the mixture into a foamed nickel base, and rolling the packed nickel base with a roller press to a designated thickness. An electrode was fabricated by providing holes of 100 microns in diameter at a rate of 100 holes/$cm^2$ in both planes of the rolled body. A sealed nickel-metal hydride battery of AA-size was prepared with the above electrodes in the same way as the embodiment 1, and the discharging capacity of the battery was determined. When the battery was charged at 0.3 C and discharged at 0.2 C, the discharging capacity was as small as 750 mAh, and the cycle life was as short as 325 cycles. When the discharging was changed to 3 C, the discharge capacity decreased to 72%, and when the charging was changed to 3 C, the discharge capacity decreased to 70%.

Comparative Example 3

An alloy of $Ti_{0.2}Zr_{0.8}Ni_{1.1}Mn_{0.6}V_{0.2}$ was used as a hydrogen storage alloy for forming a negative electrode, and the alloy particles having an average diameter of 50 microns were prepared by the same method as the comparative example 1. Then, an electrode was formed by the steps of mixing hydroxypropylmethyl cellulose as a binder and Raney nickel catalyst powder with the alloy particles, packing the mixture into a foamed nickel base, and rolling the packed nickel base with a roller press to a designated thickness. A sealed nickel-metal hydride battery of AA-size was prepared in the same way as the embodiment 1, and the discharging capacity of the battery was determined. When the battery was charged at 0.3 C and discharged at 0.2 C, he discharging capacity was as somewhat small at 850 mAh, and the cycle life was as short as 383 cycles. When the discharging was changed to 3 C, the discharge capacity decreased to 72%, and when the charging was changed to 3 C, the discharge capacity decreased to 68%.

Embodiment 2

Graphite powder was used as a car on material for the negative electrode. The graphite powder was pulverized to fine powder having an average diameter equal to or less than 0.1 micron. The graphite powder was mixed with copper powder of 0.01 micron in diameter by 0.2% by weight, and treated thermally at 3000° C. for five hours with agitating. Subsequently, the thermally treated powder was pulverized again in order to obtain the above particle size used in the present invention. The particles were processed by a dissolving treatment with a nitric acid aqueous solution at 70° C. for two hours, and washed sufficiently with water. Subsequently, the surface of a particle was observed by a SEM-EDX, and the presence of fine pores having an average diameter of 0.01~0.05 microns and trace of copper was confirmed. Other than the dissolving treatment with a warm KOH aqueous solution, the same result was obtained by flowing chlorine gas or fluorine gas to react with the precipitated phase for evaporation. A carbon electrode having a designated thickness was prepared by the steps of mixing a fluorine group binder with the particles, applying the particles onto a copper foil, and rolling with a roller press. As for a positive electrode, an electrode composed of mainly $LiCoO_2$ was used. A sealed lithium battery of AA-size was prepared using the above electrodes, and the capacity of the battery was determined. The battery capacity was designed to be 600 mAh. When the battery was charged at 0.3 C and discharged at 0.2 C, the capacity was as large as 650 mAh, and the cycle life was as long as 520 cycles. When the discharging was changed to 3 C, the capacity decreased to 92%, and when the charging was changed to 3 C, the discharge capacity decreased to 89%.

Comparative Example 4

Graphite powder was used as a carbon material for the negative electrode. The graphite powder was pulverized to fine powder having an average diameter equal to or less than 0.1 micron. The graphite powder was treated thermally at 3000° C. for five hours with agitating. The particles were processed by a dissolving treatment as in embodiment 2, and subsequently, the surface of a particle was observed by a SEM-EDX. However, fine pores were not observed. A carbon electrode having a designated thickness was prepared by the steps of mixing a fluorine group binder with the particles, applying the particles onto a copper foil, and rolling with a roller press. As for a positive electrode, an electrode composed of mainly $LiCoO_2$ was used. A sealed lithium battery of AA-size was prepared using the above electrodes, and the capacity of the battery was determined. The battery capacity was designed to be 600 mAh. When the battery was charged at 0.3 C and discharged at 0.2 C, the capacity was as small as 550 mAh, and the cycle life was as small as 420 cycles. When the discharging was changed to 3 C, the capacity decreased to 72%, and when the charging was changed to 3 C, the capacity decreased to 69%.

Embodiment 3

Lithium-cobalt oxides were used as a material for forming the positive electrode. The lithium-cobalt oxides were pulverized to fine powder having an average diameter equal to or less than 0.1 micron. The lithium-cobalt oxides powder was mixed with aluminum powder of 0.01 micron in diameter by 0.2% by weight, and treated thermally at 300° C. for five hours with agitating. Subsequently, the thermally treated powder was pulverize again in order to obtain the above particle size used in the present invention. The particles were processed by a dissolving treatment with a KOH aqueous solution at 70° C. for two hours, and washed sufficiently. Subsequently, the surface of a particle was observed by a SEM-EDX, and the presence of fine pores having an average diameter of 0.2 microns was confirmed. The same result was obtained by flowing chlorine gas or fluorine gas to react with the precipitated phase for evaporation. An electrode having a designated thickness was prepared by the steps of mixing a fluorine group binder with the particles, applying the particles onto an aluminum foil, and rolling with a roller press. As for a negative electrode, a carbon electrode was used. A sealed lithium battery of AA-size was prepared using the above electrodes, and the capacity of the battery was determined. The battery capacity was designed to be 600 mAh. When the battery was charged at 0.3 C and discharged at 0.2 C, the capacity was as large as 710 mAh, and the cycle life was as long as 580 cycles. When the discharging was changed to 3 C, the capacity decreased to 85%, and when the charging was changed to 3 C, the capacity decreased to 80%.

Comparative Example 5

Lithium-cobalt oxides were used as a material for forming the positive electrode. The lithium-cobalt oxides were pulverized to fine powder having an average diameter equal to or less than 0.1 micron, and treated thermally at 300° C. for five hours with agitating. The particles were processed by a dissolving treatment as in the embodiment 3. Subsequently, the surface of a particle was observed by a SEM-EDX, but no fine pores were confirmed. An electrode having a designated thickness was prepared by the steps of mixing a fluorine group binder with the particles, applying the particles onto an aluminum foil, and rolling with a roller press. As for a negative electrode, a carbon electrode was used. A sealed lithium battery of AA-size was prepared using the above electrodes, and the capacity of the battery was determined. When the battery was charged at 0.3 C and discharged at 0.2 C, the capacity was slightly decreased to 570 mAh, and the cycle life was as short as 380 cycles. When the discharging was changed to 3 C, the capacity decreased to 65%, and when the charging was changed to 3 C, the capacity decrease to 57%.

Embodiment 4

Figure 6:
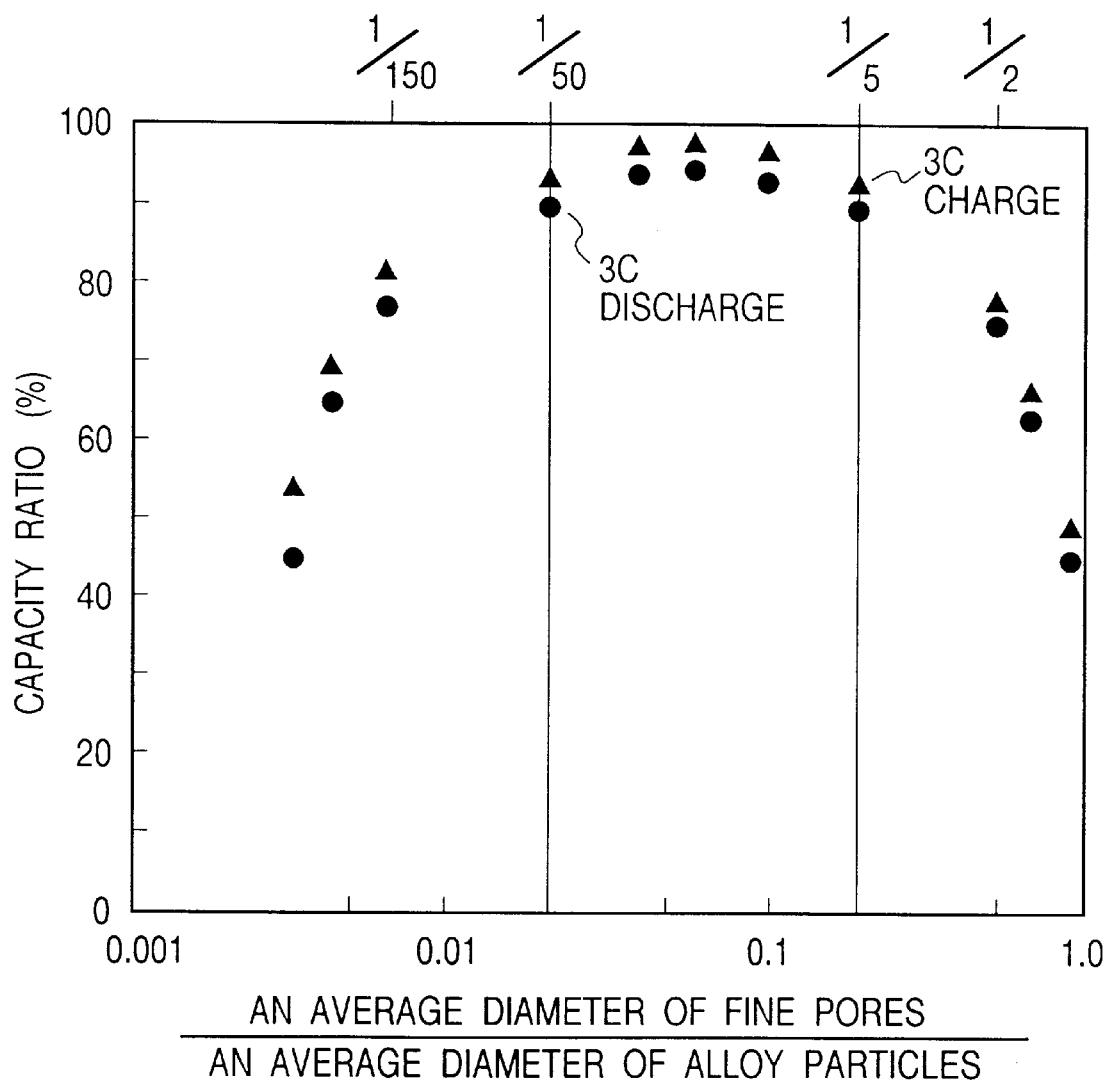
FIG. 6 is a graph indicating a relationship between a ratio of an average diameter of fine pores to an average diameter of the alloy particles and their volumetric ratio obtained by the embodiment 4, and the comparative examples 6 and 7.

An alloy of $Ti_{0.2}Zr_{0.8}Ni_{1.1}Mn_{0.6}V_{0.2}$ was used as a hydrogen storage alloy for forming a negative eletrode. The hydrogen storage alloy was mixed with boron having an average diameter of 0.1~10 microns by 0.01 to 0.1 by atomic ratio, and the alloy was obtained by the same method as used in the embodiment 1. The alloy was pulverized to particles having an average diameter of 50 microns. The fine pores were formed by the same method as in the embodiment 1. The average diameter of the fine pores obtained by the above procedure was in a range of 0.4~25 microns (1/150 to ½ of the average particle size of the alloy). Then, an electrode was formed by the same steps as in the embodiment 1, a sealed nickel-metal hydride battery of AA-size was prepared with the above electrodes, and the capacity of the battery was determined. A relationship between a ratio of the average diameter of the fine pores to the average diameter of the alloy particles and the capacity ratio is shown in FIG. 6, when the battery was charged at 3 C and discharged at 3 C. When the battery was charged at 0.3 C and discharged at 0.2 C, the capacity of the battery was as large as 920~1100 mAh, and the cycle life was as large as 500~680 cycles. When the discharging was changed to 3 C, the capacity decreased to 75~95%, and when the charging was changed to 3 C, the capacity decreased to a range of 75~95%. Especially, the capacity was the largest when the average diameter of the fine pores was in a range of ⅕ to 1/50 of the average particle size of the alloy.

Comparative Example 6

An alloy of $Ti_{0.2}Zr_{0.8}Ni_{1.1}Mn_{0.6}V_{0.2}$ was used as a hydrogen storage alloy for forming a negative electrode. The hydrogen storage alloy was mixed with boron having an average diameter of 0.05 microns by 0.1 by atomic ratio, and the alloy was obtained by the same method as used in the embodiment 1. The alloy was pulverized to particles having an average diameter of 50 microns. The fine pores were formed by the same method as the embodiment 1. The average diameter of the fine pores obtained by the above procedure was less than 0.3 microns (less than 1/150 of the average particle size of the alloy). Then, an electrode was formed by the same steps as used in the embodiment 1, a sealed nickel-metal hydride battery of AA-size was prepared with the above electrodes, and the capacity of the battery was determined. The relationship between a ratio of the average diameter of the fine pores to the average diameter of the alloy particles and the capacity ratio is additionally shown in FIG. 6, when the battery was charged at 3 C and discharged at 3 C. When the battery was charged at 0.3 C and discharged at 0.2 C, the capacity of the battery was as large as 910~950 mAh, and the cycle life was as large as 480~520 cycles. When the discharging was changed to 3 C, the discharge capacity decreased to 45~65%, and when the charging was changed to 3 C, the capacity decreased to a range of 55~68%.

Comparative Example 7

An alloy of $Ti_{0.2}Zr_{0.8}Ni_{1.1}Mn_{0.6}V_{0.2}$ was used as a hydrogen storage alloy for forming a negative electrode. The hydrogen storage alloy was mixed with boron having an average diameter of 15 microns by 0.1 by atomic ratio, and the alloy was obtained by the same method as used in the embodiment 1. The alloy was pulverized to particles having an average diameter of 50 microns. The fine pores were formed by the same method as in the embodiment 1. The average diameter of the fine pores obtained by the above procedure was more than 30 microns (more than ½ of the average particle size of the alloy). Then, an electrode was formed by the same steps as used in the embodiment 1, a sealed nickel-metal hydride battery of AA-size was prepared with the above electrodes, and a discharging capacity of the battery was determined. A relationship between a ratio of the average diameter of the fine pores to the average diameter of the alloy particles and the capacity ratio is additionally shown in FIG. 6, when the battery was charged at 3 C and discharged at 3 C. When the battery was charged at 0.3 C and discharged at 0.2 C, the capacity of the battery was as large as 920~970 mAh, and the cycle life was as large as 450~500 cycles. When the discharging was changed to 3 C, the capacity decreased to 45~63%, and when the charging was changed to 3 C, the capacity decreased to a range of 48~66%.

Embodiment 5

An alloy of $Ti_{0.2}Zr_{0.8}Ni_{1.1}Mn_{0.6}V_{0.2}B_x$ (where, X=0.01~0.8) was used as a hydrogen storage alloy, and the fine pores were formed by the same method as used in the embodiment 1. A ratio of the area occupied by the cross sectional area of the fine pores to the total surface area of the particles was in a range of 5~80%, and a ratio of the volume occupied by the total volume of the fine pores was in a range of 0.2~ 60%. Then, an electrode was formed by the same steps as used in the embodiment 1, a sealed nickel-metal hydride battery of AA-size was prepared with the above electrodes, and a discharging capacity of the battery was determined. A relationship between a ratio of the cross sectional area of the fine pores to the total surface are of the particle and the capacity ratio is shown in FIG. 7, when the battery was charged at 3 C and discharged at 3 C.

Furthermore, a relationship between a ratio of the total volume of the fine pores to the total volume of the particle and the capacity ratio is shown in FIG. 8, when the battery was charged at 3 C and discharged at 3 C. When the battery was charged at 0.3 C and discharged at 0.2 C, the capacity of the battery was as large as 920~1150 mAh, and the cycle life was as large as 430~580 cycles. When the discharging was changed to 3 C, the capacity decreased to 75~95%, and when the charging was changed to 3 C, the capacity decreased to a range of 75~98%. Especially, the capacity was large when the fine pores occupied 10 to 50% in the surface area of the particle, or 1 to 40% in the volume of the particle.

Comparative Example 8

An alloy of $Ti_{0.2}Zr_{0.8}Ni_{1.1}Mn_{0.6}V_{0.2}B_x$ (where, X=0.001~0.005) was used as a hydrogen storage alloy, and the fine pores were formed by the same method as the embodiment 1. A ratio of the area occupied by the cross sectional area of the fine pores to the total surface area of the particles was 3%, and a ratio of the volume occupied by the total volume of the fine pores was 0.1%. Then, an electrode was formed by the same steps as the embodiment 1, a sealed nickel-metal hydride battery of AA-size was prepared with the above electrodes, and a discharging capacity of the battery was determined. A relationship between a ratio of the cross sectional area of the fine pores to the total surface area of the particle and the capacity ratio is additionally shown in FIG. 7, when the battery was charged at 3 C and discharged at 3 C. Furthermore, a relationship between a ratio of the total volume of the fine pores to the total volume of the particle and the capacity ratio is additionally shown in FIG. 8, when the battery was charged at 3 C and discharged at 3 C. When the battery was charged at 0.3 C and discharged at 0.2 C, the capacity of the battery was as large as 950 mAh, but the cycle life was as short as 320 cycles. When the discharging was changed to 3 C, the capacity decreased to 50%, and when the charging was changed to 3 C, the capacity decreased to 55%.

Comparative Example 9

An alloy of $Ti_{0.2}Zr_{0.8}Ni_{1.1}Mn_{0.6}V_{0.2}B_x$ (where, X=1.0~1.8) was used as a hydrogen storage alloy, and the fine pores were formed by the same method as used in the embodiment 1. A ratio of the area occupied by the cross sectional area of the fine pores to the total surface area of the particles was 90%, and a ratio of the volume occupied by the total volume of the fine pores was 70%. Then, an electrode was formed by the same steps as in the embodiment 1, a sealed nickel-metal hydride battery of AA-size was prepared with the above electrodes, and the capacity of the battery was determined. A relationship between a ratio of the cross sectional area of the fine pores to the total surface area of the particle and the capacity ratio is additionally shown in FIG. 7, when the battery was charged at 3 C and discharged at 3 C. Furthermore, a relationship between a ratio of the total volume of the fine pores to the total volume of the particle and the capacity ratio is additionally shown in FIG. 8, when the battery was charged at 3 C and discharged at 3 C. When the battery was charged at 0.3 C and discharged at 0.2 C, the capacity of the battery was as small as 720 mAh, and the cycle life was as short as 300 cycles. When the discharging was changed to 3 C, the capacity decreased to 55%, and when the charging was changed to 3 C, the capacity decreased to 60%.

Embodiment 6

An alloy selected from the alloys shown in Table 1 was used as a hydrogen storage alloy forming a negative electrode, and a segregated phase was formed. Respective ones of the chemical elements, Al, V, Mn, Sn, B, Mg, Mo, W, Zr, K, Na, Li, Ni, and Ti, were contained in the segregated phase at least 30% by weight. The alloy was treated by a dissolving process with an aqueous solution containing any one of an acid, an alkali, an oxidizing agent, or a reducing agent at 50° C. for one hour, and then washed with water. Then, an electrode was formed by the same steps as used in the embodiment 1, a sealed nickel-metal hydride battery of AA-size was prepared with the above electrodes, and the capacity of the battery was determined. The results are shown in Table 1. When the battery was charged at 0.3 C and discharged at 0.2 C, the capacity of the battery was as large as 970~1010 mAh, and the cycle life was as long as 480~550 cycles. When the discharging was changed to 3 C, the capacity decreased to 78~95%, and when the charging was changed to 3 C, the capacity decreased to 88~95%.

TABLE 1

| Hydrogen storage alloy | Treating solution | 0.3 C– 0.2 C (mAh) | Cycle life (Cycles) | 3 C discharge (%) | 3 C charge (%) |
|---|---|---|---|---|---|
| (La Ce Nd Pr)—(Ni Mn Al Co)$_{4.5-5.5}$ | KOH, NaBH$_4$ | 960 | 510 | 91 | 98 |
| (La Ce Nd Pr)—(Ni Mn Al Co B)$_{4.5-5.5}$ | KOH, HF | 1000 | 520 | 92 | 90 |
| (La Ce Nd Pr)—(Ni Mn Al Co W)$_{4.5-5.5}$ | KOH, NaBH$_4$ | 1000 | 520 | 88 | 88 |
| (La Ce Nd Pr)—(Ni Mn Al Co Mo)$_{4.5-5.5}$ | KOH, HF | 1010 | 510 | 95 | 90 |
| (La Ce Nd Pr)—(Ni Mn Al Co Mg)$_{4.5-5.5}$ | KOH, HF | 980 | 500 | 94 | 98 |
| (La Ce Nd Pr)—(Ni Mn Al Co K)$_{4.5-5.5}$ | KOH, HNO$_3$ | 970 | 550 | 78 | 88 |
| (La Ce Nd Pr)—(Ni Mn Al Co Na)$_{4.5-5.5}$ | KOH, NaClO | 970 | 550 | 79 | 89 |
| (La Ce Nd Pr)—(Ni Mn Al Co Pd)$_{4.5-5.5}$ | KOH, KPH$_2$O$_2$ | 990 | 480 | 80 | 95 |
| (La Ce Nd Pr)—(Ni Mn Al Co Sn)$_{4.5-5.5}$ | KOH, NaPH$_2$O$_2$ | 1000 | 490 | 95 | 98 |
| (La Ce Nd Pr)—(Ni Mn Al Co Fe)$_{4.5-5.5}$ | KOH, CH$_2$O, HF | 970 | 480 | 88 | 94 |
| (Ca La Ce Nd Pr)—(Ni Mn Al Co)$_{4.5-5.5}$ | KOH, H$_2$O$_2$, HF | 1000 | 490 | 86 | 92 |
| (Zr Ti)—(Ni Mn V Co B)$_{1.5-2.5}$ | KOH, NaBH$_4$ | 1010 | 500 | 89 | 91 |
| (Zr Ti Hf)—(Ni Mn V Co Mo)$_{1.5-2.5}$ | KOH, NaClO | 970 | 510 | 79 | 90 |
| (Zr Ti Sc)—(Ni Mn V Co W)$_{1.5-2.5}$ | KOH, HNO$_3$, HF | 990 | 550 | 93 | 89 |
| (Zr Ti Mg)—(Ni Mn V Co K)$_{1.5-2.5}$ | KOH, NaBH$_4$ | 990 | 550 | 94 | 88 |
| (Zr Ti)—(Ni Mn V Co Pd)$_{1.5-2.5}$ | KOH, H$_2$O$_2$, HF | 980 | 510 | 79 | 89 |
| (Zr Ti)—(Ni Mn V Co Sn)$_{1.5-2.5}$ | KOH, HNO$_3$, HF | 980 | 550 | 81 | 97 |
| (Zr Ti)—(Ni Mn V Co Fe)$_{1.5-2.5}$ | KOH, HNO$_3$, HF | 990 | 490 | 84 | 91 |
| (Zr Ti)—(Ni Mn V Co Cr)$_{1.5-2.5}$ | KOH, HNO$_3$, HF | 1000 | 490 | 94 | 97 |
| (Zr Ti)—(Ni Mn V Co Li)$_{1.5-2.5}$ | KOH, NaBH$_4$ | 1010 | 480 | 83 | 90 |
| (Zr Ti)—(Ni Mn V Co Fe)$_{1.5-2.5}$ | KOH, HNO$_3$, HF | 1000 | 490 | 80 | 89 |
| (Zr Ti)—(Ni Mn V Co Cr)$_{1.5-2.5}$ | KOH, NaClO | 980 | 480 | 90 | 96 |
| (Zr Ti)—(Ni Mn V Co Al)$_{1.5-2.5}$ | KOH, NaBH$_4$ | 970 | 500 | 93 | 97 |
| (Zr Ti)—(Ni Mn V Co Cr Fe)$_{1.5-2.5}$ | KOH, HNO$_3$, HF | 970 | 540 | 90 | 89 |
| (Zr Ti)—(Ni Mn V Co C)$_{1.5-2.5}$ | KOH, H$_2$O$_2$ | 980 | 510 | 95 | 88 |
| (Zr Ti)—(Ni Mn V Co Pb)$_{1.5-2.5}$ | KOH, HNO$_3$, HF | 1000 | 490 | 91 | 97 |

TABLE 1-continued

| Hydrogen storage alloy | Treating solution | 0.3 C– 0.2 C (mAh) | Cycle life (Cycles) | 3 C discharge (%) | 3 C charge (%) |
|---|---|---|---|---|---|
| (Zr Ti)–(Ni Mn V Co Sn)$_{1.5-2.5}$ | KOH, HNO$_3$, HF | 1000 | 530 | 79 | 89 |
| (Mg Zr Ti)$_{2.0}$–(Ni Mn V Co B)$_{0.5-1.5}$ | KOH, NaBH$_4$ | 970 | 480 | 78 | 89 |
| (Mg Zr Ti)$_{2.0}$–(Ni Mn V Co W)$_{0.5-1.5}$ | KOH, NaClO | 970 | 480 | 80 | 92 |
| (Mg Zr Ti)$_{2.0}$–(Ni Mn V Co Mo)$_{0.5-1.5}$ | KOH, NaBH$_4$ | 980 | 520 | 82 | 92 |
| (Mg Zr Ti)$_{2.0}$–(Ni Mn V Co)$_{0.5-1.5}$ | KOH, HNO$_3$, HF | 1000 | 540 | 91 | 97 |
| (Mg Zr Ti)$_{2.0}$–(Ni Mn Al Co)$_{0.5-1.5}$ | KOH, H$_2$O$_2$ | 980 | 530 | 95 | 98 |
| (Mg Zr Ti)$_{2.0}$–(Ni Mn Al Co B)$_{0.5-1.5}$ | KOH, NaBH$_4$ | 970 | 500 | 87 | 92 |
| (Mg Zr Ti)$_{2.0}$–(Ni Mn Al Co W)$_{0.5-1.5}$ | KOH, HNO$_3$, HF | 970 | 510 | 89 | 94 |
| (Mg Zr Ti)$_{2.0}$–(Ni Mn V Co Mo)$_{0.5-1.5}$ | KOH, NaClO | 980 | 490 | 80 | 91 |

Embodiment 7

Graphite powder was used as a carbon material for the negative electrode. The graphite powder was pulverized to fine powder having an average diameter equal to or less than 0.1 micron. The graphite powder was mixed with any one of the additive elements selected from the chemical elements shown in Table 2 by 0.2% by weight, the additive element was 0.01 micron in diameter, and treated thermally at 3000° C. for five hours with agitating. Subsequently, the thermally treated powder was pulverized again in order to obtain the above particle size used in the present invention. The particles were by a dissolving treatment with a nitric acid aqueous solution at 70° C. for two hours, and then washed sufficiently with water. Subsequently, the surface of a particle was observed by a SEM-EDX, and the presence of fine pores having an average diameter of 0.01 microns was confirmed. A sealed lithium battery of AA-size was prepared as in the embodiment 2, and the capacity of the battery was determined. The results of the capacity determination are shown in Table 2. When the battery was charged at 0.3 C and discharged at 0.2 C, the capacity was as large as 670~750 mAh, and the cycle life was as long as 480~520 cycles. When the discharging was changed to 3 C, the capacity decreased to 82~85%, and when the charging was changed to 3 C, the capacity decreased to 79~85%.

TABLE 2

| Additive element | 0.3 C charge–0.2 C discharge (mAh) | Cycle life (Cycles) | 3 C Discharge (%) | 3 C Charge (%) |
|---|---|---|---|---|
| Fe | 720 | 510 | 85 | 84 |
| Ni | 690 | 490 | 82 | 85 |
| S | 700 | 490 | 82 | 84 |
| Si | 710 | 500 | 82 | 80 |
| Sn | 690 | 520 | 83 | 79 |
| Li | 700 | 480 | 82 | 79 |
| Na | 670 | 490 | 82 | 79 |
| K | 750 | 480 | 85 | 80 |
| Pb | 740 | 480 | 85 | 79 |
| FeO$_x$ | 700 | 520 | 84 | 80 |
| NiO$_x$ | 710 | 500 | 82 | 85 |
| SiO$_x$ | 750 | 510 | 85 | 83 |
| SnO$_x$ | 710 | 510 | 83 | 84 |
| LiO$_x$ | 670 | 490 | 84 | 82 |
| PbO$_x$ | 680 | 500 | 84 | 81 |

Comparative Example 10

Graphite powder was used as a carbon material for the negative electrode. The graphite powder was pulverized to a fine powder having an average diameter equal to or less than 0.1 micron. The graphite powder was mixed with iron powder of 0.01 micron in diameter by 55% by weight, and treated thermally at 3000° C. for five hours with agitating. The particles of the powder were processed by a dissolving treatment with a nitric acid aqueous solution at 70° C. for two hours, and then washed sufficiently with water. Subsequently, the surface of a particle was observed by a SEM-EDX, and the formation of fine pores having an average diameter of 0.8 microns was confirmed. A sealed lithium battery of AA-size was prepared as in the embodiment 2, and the capacity of the battery was determined. When the battery was charged at 0.3 C and discharged at 0.2 C, the capacity was as small as 470 mAh, and the cycle life was as short as 380 cycles. When the discharging was changed to 3 C, the capacity decreased to 50~71%, and when the charging was changed to 3 C, the capacity decreased to 55~64%.

Comparative Example 11

Graphite powder was used as a carbon material for the negative electrode. The graphite powder was pulverized to a fine powder having an average diameter equal to or less than 0.1 micron. The graphite powder was mixed with iron powder of 0.01 micron in diameter by 0.01% by weight, and treated thermally at 3000° C. for five hours with agitating. The particles of the powder were processed by a dissolving treatment with a nitric acid aqueous solution at 70° C. for two hours, and then washed sufficiently with water. Subsequently, the surface of a particle was observed by a SEM-EDX, and the formation of fine pores having an average diameter of 0.04 microns was confirmed. A sealed lithium battery of AA-size was prepared as in the embodiment 2, and the capacity of the battery was determined. When the battery was charged at 0.3 C and discharged at 0.2 C, the capacity was as large as 670 mAh, but the cycle life was as short as 280 cycles. When the discharging was changed to 3 C, the capacity decreased to 57~72%, and when the charging was changed to 3 C, the capacity decreased to 55~69%.

Embodiment 8

Polyacetylene powder was used as a conductive polymer material for the positive electrode. The polyacetylene powder was pulverized to a fine powder having an average diameter equal to or less than 0.1 micron. The polyacetylene powder was mixed with any one of the additive elements selected from the chemical elements shown in Table 3, the additive element being a powder of 0.05 micron in diameter, by 0.2% by weight, and the powder was treated thermally at 300° C.~500° C. for five hours with agitating. Subsequently, the thermally treated powder was pulverized again in order to obtain the above particle size used in the present invention. The particles were processed by a dissolving treatment with a nitric acid aqueous solution at 70° C. for two hours, and then washed sufficiently with water. Subsequently, the surface of a particle was observed by a SEM-EDX, and the formation of fine pores having an average diameter of 0.08 microns was confirmed. Other than the dissolving treatment with a warm KOH aqueous solution, the same result was obtained by flowing chlorine gas or fluorine gas to react with the precipitated phase for evaporation. An electrode having a designated thickness was prepared by the steps of mixing a fluorine group binder with the particles, applying the particles onto an aluminum foil, and rolling with a roller press. As for a negative electrode, a carbon electrode was used. A sealed lithium battery of AA-size was prepared using the above electrodes, and the capacity of the battery was determined. The battery capacity was designed to be 500 mAh. The result of the capacity determination is shown in Table 3. When the battery was charged at 0.3 C and discharged at 0.2 C, the capacity was as large as 570~640 mAh, and the cycle life was as long as 490~670 cycles. When the discharging was changed to 3 C, the capacity decreased to 81~91%, and when the charging was changed to 3 C, the discharge capacity decreased to 78~87%.

TABLE 3

| Additive element | 0.3 C charge–0.2 C discharge (mAh) | Cycle life (Cycles) | 3 C Discharge (%) | 3 C Charge (%) |
| --- | --- | --- | --- | --- |
| Fe | 610 | 520 | 91 | 87 |
| Ni | 640 | 500 | 88 | 84 |
| S | 620 | 490 | 82 | 86 |
| Si | 640 | 500 | 85 | 87 |
| Sn | 600 | 510 | 84 | 85 |
| Li | 570 | 670 | 81 | 84 |
| Na | 570 | 620 | 83 | 79 |
| K | 580 | 600 | 84 | 78 |
| Pb | 570 | 610 | 82 | 85 |
| $FeO_x$ | 590 | 600 | 91 | 78 |
| $NiO_x$ | 600 | 490 | 81 | 80 |
| $SiO_x$ | 620 | 500 | 85 | 84 |
| $SnO_x$ | 590 | 550 | 86 | 87 |
| $LiO_x$ | 600 | 520 | 86 | 86 |
| $PbO_x$ | 590 | 550 | 82 | 79 |

Embodiment 9

Polyacetylene powder was used as a conductive polymer material for the negative electrode. The polyacetylene powder was pulverized to a fine powder having an average diameter equal to or less than 0.1 micron. The polyacetylene powder was mixed with any one of the additive elements selected from the chemical elements shown in Table 4 by 0.2% by weight, the additive element being a powder of 0.01 micron in diameter, and the powder was treated thermally at 1000° C.~3000° C. for five hours with agitating. Subsequently, the thermally treated powder was pulverized again in order to obtain the above particle size used in the present invention. The particles were processed by a dissolving treatment with a nitric acid aqueous solution at 70° C. for two hours, and washed sufficiently with water. Subsequently, a surface of a particle was observed by a SEM-EDX, and the formation of fine pores having an average diameter of 0.02 microns was confirmed. Other than the dissolving treatment with a warm KOH aqueous solution, the same result was obtained by flowing chlorine gas or fluorine gas to react with the precipitated phase for evaporation. An electrode having a designated thickness was prepared by the steps of mixing a fluorine group binder with the particles, applying the particles onto a copper foil, and rolling with a roller press. As for the positive electrode, an electrode composed of mainly $LiCoO_2$ was used. A sealed lithium battery of AA-size was prepared using the above electrodes, and the capacity of the battery was determined. The battery capacity was designed to be 600 mAh. The result of the capacity determination is shown in Table 4. When the battery was charged at 0.3 C and discharged at 0.2 C, the capacity was as large as 700~860 mAh, and the cycle life was as long as 580~700 cycles. When the discharging was changed to 3 C, the capacity decreased to 88~93%, and when the charging was changed to 3 C, the discharge capacity decreased to 82~90%.

TABLE 4

| Additive element | 0.3 C charge–0.2 C discharge (mAh) | Cycle life (Cycles) | 3 C Discharge (%) | 3 C Charge (%) |
| --- | --- | --- | --- | --- |
| Fe | 860 | 660 | 91 | 88 |
| Ni | 760 | 700 | 88 | 90 |
| S | 740 | 650 | 90 | 82 |
| Si | 790 | 600 | 90 | 82 |
| Sn | 700 | 580 | 91 | 83 |
| Li | 710 | 600 | 88 | 85 |
| Na | 700 | 590 | 88 | 82 |
| K | 700 | 580 | 89 | 86 |
| Pb | 710 | 580 | 93 | 83 |
| $FeO_x$ | 860 | 580 | 90 | 89 |
| $NiO_x$ | 800 | 600 | 93 | 90 |
| $SiO_x$ | 810 | 660 | 92 | 88 |
| $SnO_x$ | 710 | 690 | 89 | 89 |
| $LiO_x$ | 700 | 700 | 93 | 82 |
| $PbO_x$ | 700 | 600 | 90 | 85 |

Embodiment 10

Each of the alloys shown in Table 5 was used as the negative electrode. The alloy was melted at a temperature in a range of 1100° C. to 1500° C., cooled with a speed in a range of 0.01° C./min. to 0.5° C./min., an annealed at a temperature in a range of 300° C. to 500° C. Then, the alloy was pulverized to form particles, having an average diameter equal to or less than 50 micron, was by a dissolving treatment with a nitric acid aqueous solution at 70° C. for two hours, and then washed sufficiently with water. Subsequently, the surface of a particle was observed by a SEM-EDX, and the formation of fine pores having an average diameter of 2 microns was confirmed. The same result was obtained by flowing chlorine gas or fluorine gas to react with the precipitated phase for evaporation. An electrode having a designated thickness was prepared by the steps of mixing a fluorine group binder with the particles, applying the particles onto a copper foil, and rolling with a roller press. As for the positive electrode, an electrode composed of mainly $LiCoO_2$ was used. A sealed lithium battery of AA-size was prepared using the above electrodes, and the capacity of the battery was determined. The battery capacity was designed to be 600 mAh. The result of the capacity determination is shown in Table 5. When the battery was charged at 0.3 C and discharged at 0.2 C, the capacity was as large as 700~760 mAh, and the cycle life was as long as 480~530 cycles. When the discharging was changed to 3 C, the capacity decreased to 85~91%, and when the charging was changed to 3 C, the discharge capacity decreased to 88~98%.

TABLE 5

| Additive element | 0.3 C charge–0.2 C discharge (mAh) | Cycle life (Cycles) | 3 C Discharge (%) | 3 C Charge (%) |
|---|---|---|---|---|
| Si—Ni | 760 | 510 | 91 | 98 |
| Ge—Si | 720 | 530 | 90 | 90 |
| Mg—Si | 700 | 480 | 85 | 91 |
| Si—Ni—Ge | 750 | 480 | 88 | 88 |
| Si—Ni—Mg | 700 | 500 | 91 | 90 |
| Si—Ni—Mn | 720 | 510 | 90 | 88 |
| Si—Ni—Cu | 750 | 480 | 88 | 95 |

Embodiment 11

Each of the oxides and sulfides shown in Table 6 was used as the positive electrode. The oxide or the sulfide was pulverized to form particles, having an average diameter equal to or less than 1 micron, was mixed with the additive element shown in Table 6 by 0.2% by weight, the additive element being in powder of 0.1 micron in diameter, and the powder was treated thermally at 300° C.~900° C. for five hours with agitating. Then, the mixture was pulverized again in order to obtain particles having the above average diameter suitable for the present invention. The particles were processed by a dissolving treatment with a nitric acid aqueous solution at 70° C. for two hours, and then washed sufficiently with water. Subsequently, the surface of a particle was observed by a SEM-EDX, and the formation of fine pores having an average diameter of 0.2 microns was confirmed. The same result was obtained by flowing chlorine gas or fluorine gas to react with the precipitated phase for evaporation. An electrode having a designated thickness was prepared by the steps of mixing a fluorine group binder with the particles, applying the particles onto an aluminum foil, and rolling with a roller press. As for the negative electrode, a carbon electrode was used. A sealed lithium battery of AA-size was prepared using the above electrodes, and the capacity of the battery was determined. The battery capacity was designed to be 600 mAh. The result of the capacity determination is shown in Table 6. When the battery was charged at 0.3 C and discharged at 0.2 C, the capacity was as large as 680~770 mAh, and the cycle life was as long as 490~640 cycles. When the discharging was changed to 3 C, the capacity decreased to 81~90%, and when the charging was changed to 3 C, the discharge capacity decreased to 78~85%.

In accordance with the present invention, the secondary battery was improved significantly in that it provided increased capacity, rapid charging characteristics, and rapid discharging characteristics.

TABLE 6

| Composition of positive electrode | Additive element | 0.3 C charge– 0.2 C discharge (mAh) | Cycle life (cycles) | 3 C discharge (%) | 3 C charge (%) |
|---|---|---|---|---|---|
| $LiCoO_{1.5-2.5}$ | Al | 760 | 490 | 81 | 82 |
| $LiMnO_{1.5-2.5}$ | Sn | 770 | 510 | 88 | 85 |
| $LiNiO_{1.5-2.5}$ | Mn | 690 | 550 | 90 | 85 |
| $LiFeO_{1.5-2.5}$ | B | 700 | 540 | 87 | 84 |
| $Li(Co\,Cr)_{1.0}O_{1.5-2.5}$ | K | 710 | 490 | 87 | 78 |
| $Li(Co\,Pb)_{1.0}O_{1.5-2.5}$ | Na | 700 | 610 | 88 | 85 |
| $Li(Co\,Bi)_{1.0}O_{1.5-2.5}$ | Al | 700 | 640 | 81 | 79 |
| $Li(Ni\,Nb)_{1.0}O_{1.5-2.5}$ | Sn | 750 | 610 | 90 | 80 |
| $Li(Ni\,Mo)_{1.0}O_{1.5-2.5}$ | Al | 680 | 500 | 87 | 79 |
| $Li(Ni\,Sr)_{1.0}O_{1.5-2.5}$ | B | 710 | 490 | 86 | 80 |
| $Li(Ni\,Ta)_{1.0}O_{1.5-2.5}$ | Sn | 770 | 550 | 88 | 79 |
| $Li(Ni\,Fe)_{1.0}O_{1.5-2.5}$ | Al | 750 | 550 | 89 | 79 |
| $Li(Ni\,Co)_{1.0}O_{1.5-2.5}$ | Al | 700 | 600 | 81 | 78 |
| $Li(Co\,Mn)_{1.0}O_{1.5-2.5}$ | Sn | 710 | 610 | 85 | 85 |
| $Li(Ni\,Mn)_{1.0}O_{1.5-2.5}$ | Al | 720 | 640 | 84 | 84 |
| $Li(Ni\,Fe)_{1.0}O_{1.5-2.5}$ | Al | 740 | 610 | 81 | 81 |
| $Li(Fe\,Co)_{1.0}O_{1.5-2.5}$ | B | 700 | 640 | 90 | 79 |
| $Li(Fe\,Mn)_{1.0}O_{1.5-2.5}$ | Al | 680 | 610 | 89 | 85 |
| $LiMn_{2.0}O_{3.0-5.0}$ | Sn | 680 | 600 | 90 | 83 |
| $TiS_{1.5-2.5}$ | Al | 690 | 590 | 90 | 84 |
| $MoS_{1.5-2.5}$ | B | 710 | 490 | 88 | 80 |
| $(Mo\,Fe)_{1.0}S_{1.5-2.5}$ | Al | 690 | 500 | 87 | 80 |
| $(Mo\,Ta)_{1.0}S_{1.5-2.5}$ | Sn | 680 | 490 | 81 | 80 |
| $(Mo\,Sr)_{1.0}S_{1.5-2.5}$ | Al | 730 | 500 | 89 | 78 |
| $(Mo\,Ni)_{1.0}S_{1.5-2.5}$ | B | 680 | 520 | 88 | 83 |
| $(Mo\,Nb)_{1.0}S_{1.5-2.5}$ | Al | 710 | 510 | 87 | 82 |
| $(Mo\,Pb)_{1.0}S_{1.5-2.5}$ | Sn | 700 | 550 | 89 | 85 |
| $(Mo\,Cu)_{1.0}S_{1.5-2.5}$ | K | 680 | 510 | 90 | 80 |
| $(Mo\,V)_{1.0}S_{1.5-2.5}$ | K | 710 | 580 | 88 | 82 |
| $(Mo\,MN)_{1.0}S_{1.5-2.5}$ | B | 750 | 620 | 87 | 79 |
| $LiV_3O_{6.0-10.0}$ | B | 770 | 560 | 87 | 84 |
| $CuV_2O_{4.5-7.5}$ | B | 750 | 560 | 82 | 80 |

What is claimed is:

1. A secondary battery comprising
   a positive electrode,
   a negative electrode, and
   an electrolyte which separates said electrodes, wherein:
      said positive electrode or said negative electrode contains particles composed of a material which contributes to a charge-discharge reaction,
      said particles comprise at least two phases comprising different elements, and
      at least one phase of said phases comprises fine pores.

2. A secondary battery according to claim 1, wherein said pores exist only at a plane which is contacted with an electrolyte and not in the interior of the particles.

3. A secondary battery according to claim 1, wherein said pores are defects formed by treating said particles.

4. A secondary battery according to claim 1, wherein said pores result from the dissolution of a phase from a dispersed state.

5. A secondary battery according to claim 1, wherein said pores are the product of a dissolving agent.

6. A secondary battery comprising
   a positive electrode,
   a negative electrode, and
   an electrolyte which separates said electrodes, wherein:
      said positive electrode or said negative electrode contains particles composed of a material which contributes to a charge-discharge reaction,
      said particles comprise at least two phases, and
      at least one phase of said phases comprises fine pores which are formed by dissolution or evaporation.

7. A secondary battery as claimed in any of claims 1 and 6, wherein:
   said fine pores exist at surface of said particle, whereon said particle contacts with said electrolyte.

8. A secondary battery comprising
   a positive electrode,
   a negative electrode, and an electrolyte which separates said electrodes, wherein:
said positive electrode or said negative electrode contains particles composed of a material which contributes to a charge-discharge reaction,
surface of said particle comprises fine pores, and
a composition of surface of said fine pores differs from the composition of surface internal of said particle around said fine pores.

9. A secondary battery as claimed in any one of claims 1 to 4, wherein:
said particles are composed of carbon having at least two phases, and
internal surface of said carbon comprises fine pores formed by dissolution or evaporation of at least one of said phases.

10. A secondary battery as claimed in any of claims 1 and 6, wherein:
said particles have an average particle diameter equal to or less than 2 mm, and
said particles comprise fine pores having an average diameter in a range of ½ to ¹/₁₅₀ of the average particle diameter of said particles.

11. A secondary battery as claimed in any of claims 1 and 6, wherein:
said particle comprises fine pores having a total surface area in a range of 5% to 80% of the surface area of said particles.

12. A secondary battery as claimed in of claims 1 and 6, wherein:
said particle comprises fine pores having a total volume in a range of 0.2% by volume to 60% by volume of the volume of said particles.

13. An electrode for a secondary battery which comprises
a positive electrode,
a negative electrode, and
an electrolyte which separates sail electrodes, wherein:
any one of said positive electrode or negative electrode contains particles composed of material contributing a charge-discharge reaction, and
said particles comprise at least two phases, and fine pores which are formed by dissolving at least one of said phases.

14. An electrode for a secondary battery as claimed in claim 13, wherein:
said particle contains material contributing to said charge-discharge reaction,
said particle comprises fine pores at its surface, and
a composition at the surface of said fine pores differs from the composition at the surface of said particle around said fine pores.

15. An electrode for a secondary battery as claimed in claim 13, wherein:
said fine pore comprises at least one of transition metals at its surface.

* * * * *